US012024200B1

(12) United States Patent
Choi

(10) Patent No.: US 12,024,200 B1
(45) Date of Patent: Jul. 2, 2024

(54) STEERING SYSTEM OF AUTO-MOBILITY FOR EFFECTIVE DRIVING OF AUTO-MOBILITY IN VARIOUS DRIVING ENVIRONMENTS

(71) Applicant: CLABIL CO., LTD., Seoul (KR)

(72) Inventor: Sang Chun Choi, Seoul (KR)

(73) Assignee: CLABIL CO., LTD., Seoul (KR)

( * ) Notice: Subject to any disclaimer, the term of this patent is extended or adjusted under 35 U.S.C. 154(b) by 0 days.

(21) Appl. No.: 18/360,279

(22) Filed: Jul. 27, 2023

Related U.S. Application Data

(63) Continuation of application No. PCT/KR2023/007842, filed on Jun. 8, 2023.

(51) Int. Cl.
| | |
|---|---|
| *B62D 5/04* | (2006.01) |
| *B60W 60/00* | (2020.01) |
| *B62D 1/20* | (2006.01) |
| *B62D 7/16* | (2006.01) |
| *F16H 1/04* | (2006.01) |

(52) U.S. Cl.
CPC ....... *B60W 60/0016* (2020.02); *B62D 5/0421* (2013.01); *B62D 5/046* (2013.01); *B62D 7/163* (2013.01); *B60W 2710/207* (2013.01)

(58) Field of Classification Search
None
See application file for complete search history.

(56) References Cited

U.S. PATENT DOCUMENTS

| | | | | |
|---|---|---|---|---|
| 3,788,159 A | * | 1/1974 | Plant, II | B62D 3/12 |
| | | | | 74/498 |
| 2005/0098376 A1 | * | 5/2005 | Ozsoylu | B62D 5/0424 |
| | | | | 180/444 |

FOREIGN PATENT DOCUMENTS

| | | | |
|---|---|---|---|
| JP | 2015067060 A | | 4/2015 |
| KR | 20130012827 A | | 2/2013 |
| KR | 20130069119 A | * | 6/2013 |
| KR | 20130069119 A | | 6/2013 |
| KR | 102265660 B1 | * | 6/2021 |
| KR | 102265660 B1 | | 6/2021 |
| KR | 20210073721 A | | 6/2021 |
| KR | 20210152271 A | | 12/2021 |
| KR | 102401563 B1 | | 5/2022 |
| KR | 20220156698 A | | 11/2022 |

* cited by examiner

*Primary Examiner* — Jonathan M Dager
*Assistant Examiner* — Laura E Linhardt
(74) *Attorney, Agent, or Firm* — Guntin & Gust, PLC; Miyoung Shin

(57) ABSTRACT

Embodiments relate to a steering system installed in an autonomous vehicle including a front wheel module configured to steer front wheels of the autonomous vehicle using a first motor, a rear wheel module configured to steer rear wheels of the autonomous vehicle using a second motor, a longitudinal axis module connecting the front wheel module to the rear wheel module and configured to steer each of the front wheel and the rear wheel of the autonomous vehicle inward using a third motor, and a controller configured to control a driving motor for providing a rotation power to the first to third motors and at least one of the front wheels and the rear wheels.

12 Claims, 16 Drawing Sheets

STEERING SYSTEM OF AUTO-MOBILITY FOR EFFECTIVE DRIVING OF AUTO-MOBILITY IN VARIOUS DRIVING ENVIRONMENTS

CROSS-REFERENCE TO RELATED APPLICATION(S)

The present application is a continuation of and claims the benefit of priority to PCT Patent Application No. PCT/KR2023/007842 filed Jun. 8, 2023, which claims priority to Korean Patent Application No. 10-2023-0021025 filed on Feb. 16, 2023, the disclosures of which are hereby incorporated herein by reference in their entirety.

FIELD OF THE DISCLOSURE

Embodiments of the present disclosure relate to a steering system of an autonomous vehicle for effective driving of the autonomous vehicle in various driving environments.

BACKGROUND

Due to the severity of environmental problems caused by the use of fossil fuels such as gasoline and diesel and the depletion of limited resources, eco-friendly vehicles, such as an electric vehicle, a fuel cell vehicle, and a hybrid electric vehicle, driven by a motor have been developed and operated.

An in-wheel system is a system in which a small individual motor (in-wheel motor) is installed inside a wheel to independently and directly control each wheel in eco-friendly vehicles that use electricity as a power source.

The in-wheel system can mount an individual motor inside each wheel and simplify a driving system by having excellent space utilization, compared to vehicles having a large driving motor, and improve behavior performance of the vehicle by independently and directly controlling the wheel such as independently adjusting a torque.

In addition, there is an advantage in that steering is possible by driving with a transverse force generated by adjusting a torque difference between left and right wheels and a complicated power transmission device such as a transmission or a differential can be omitted.

However, conventional in-wheel systems have limitations in efficiency when responding to various driving environments as performance of the conventional in-wheel systems may be limited to a left turn or a right turn.

SUMMARY

Based on the above description, embodiments of the present disclosure is directed to a steering system of an autonomous vehicle for the efficiently driving of the autonomous vehicle in various driving environments by enabling all of a left turn, a right turn, a left/right diagonal driving, and a zero turn.

One or more aspects of the subject disclosure are directed to a steering system installed in an autonomous vehicle having front wheels and rear wheels. The steering system includes a front wheel module configured to steer the front wheels of the autonomous vehicle through a first rotation power of a first motor, a rear wheel module configured to steer the rear wheels of the autonomous vehicle through a second rotation power of a second motor, a longitudinal axis module connecting the front wheel module to the rear wheel module and configured to steer each of a left wheel and a right wheel of the front wheels and each of a left wheel and a right wheel of the rear wheels of the autonomous vehicle inward through a third rotation power of a third motor, and a controller configured to control a driving motor for providing a fourth rotation power to the first, the second and the third motors and the front wheels, the rear wheels, or both.

In at least one variant, the front wheel module included a first rack and pinion installed between the left wheel and the right wheel of the front wheels and having a first rack moving to a left side or a right side by the first rotation power of the first motor in order to steer the front wheels, front links having one ends connected to both ends of the first rack and the pinion through first joints within the front wheel module, and front base frames connected to the other ends of the front links through the first joints within the front wheel module and configured to support the left wheel and the right wheel of the front wheels. The rear wheel module includes a second rack and pinion installed between the left wheel and the right wheel of the rear wheels and having a second rack moving to a left side or a right side by the second rotation power of the second motor in order to steer the rear wheels, rear links having one ends connected to both ends of the second rack and pinion through second joints, and rear base frames connected to the other ends of the rear links through second joints within the rear wheel module and configured to support the left wheel and the right wheel of the rear wheels. The first joints within the front wheel module are coupled to the front links and the front base frames of the front wheel module to turn about a first coupling axis when a steering control force generated by a first movement of the first rack in a left or right direction is applied thereto. The second joints within the rear wheel module are coupled to the rear links and the rear base frames within the rear wheel module to turn about a second coupling axis when the steering control force generated by a second movement of the second rack in the left or right direction is applied thereto.

In another variant, the controller is configured to supply a 1-1 control command, which allows the first rack to move in a left direction toward the left wheel of the front wheels by rotating the first motor in a first rotation direction, to the first motor in order to control the autonomous vehicle to turn left, and supply a 1-2 control command, which allows the first rack to move in a right direction toward the right wheel of the front wheels by rotating the first motor in a second rotation direction that is a direction opposite to the first rotation direction, to the first motor in order to control the autonomous vehicle to turn right.

In another variant, the controller is further configured to supply a 2-2 control command, which allows the second rack to move in the left direction by rotating the second motor in the second rotation direction, to the second motor in order to further reduce a left-turn radius of the autonomous vehicle than the left-turn radius of steering the front wheels or steering the rear wheels. The controller is further configured to supply a 2-1 control command, which allows the second rack to move in the right direction by rotating the second motor in the first rotation direction, to the second motor in order to further reduce a right-turn radius of the autonomous vehicle than the right-turn radius of steering the front wheels or steering the rear wheels.

In further another variant, the controller is configured to supply a 1-1 control command, which allows the first rack to move in a left direction toward the left wheel of the front wheels by rotating the first motor in a first rotation direction, to the first motor, and supply a 2-2 control command, which allows the second rack to move in a right direction toward the right wheel of the front wheels by rotating the second motor in a second rotation direction that is a direction opposite to the first rotation direction, to the second motor in order for the autonomous vehicle to drive in a left diagonal direction. The controller is further configured to supply a 1-2 control command, which allows the first rack to move in the right direction by rotating the first motor in the second rotation direction, to the first motor, and supply a 2-1 control command, which allows the second rack to move in the left direction by rotating the second motor in the first rotation direction, to the second motor in order for the autonomous vehicle to drive in a right diagonal direction. A steering angle according to the 1-1 control command and a steering angle according to the 2-2 control command are parallel to each other. A steering angle according to the 1-2 control command and a steering angle according to the 2-1 control command are parallel to each other.

In another variant, the first joints within the front wheel module are coupled to the first rack and pinion and the front links so that the steering control force according to the first movement of the first rack is transmitted to the front base frames within the front wheel module through the front links without turning about the first coupling axis when the first rack moves in the left or right direction. The second joints within the rear wheel module are coupled to the second rack and pinion and the rear links so that the steering control force according to the second movement of the second rack is transmitted to the rear base frames through the rear links without turning about the second coupling axis when the second rack moves in the left or right direction.

In another variant, the longitudinal axis module includes a first ball screw coupled to the third motor so that the first ball screw rotates according to the third rotation power of the third motor, a first ball screw case coupled to the first ball screw to move along an extending axis of the first ball screw when the first ball screw rotates, wherein the first ball screw case is coupled to the first rack and pinion so that the first rack and pinion moves along the extending axis according to the rotation of the first ball screw, a second ball screw coupled to the first ball screw so that the second ball screw rotates according to the rotation of the first ball screw, and a second ball screw case coupled to the second ball screw to move along an extending axis of the second ball screw when the second ball screw rotates, wherein the second ball screw case is coupled to the second rack and pinion so that the second rack and pinion moves along the extending axis according to the rotation of the second ball screw.

In another variant, the first and second rack and pinions are coupled to the extending axes of the first ball screw and the second ball screw in an orthogonal state. When the third motor rotates in a first rotation direction, in the front wheel module, the front base frames within the front wheel module do not turn about the first joints within the front wheel module, angles between the front base frames within the front wheel module and the front links are fixed, where one ends of the front links connected to the first rack and pinion move by turning about the first joints within the front wheel module, and thus the front links are diagonally arranged in a plan view of the autonomous vehicle. In the rear wheel module, the rear base frames within the rear wheel module do not turn about the second joints within the rear wheel module, angles between the rear base frames within the rear wheel module and the rear links are fixed, wherein one ends of the rear links connected to the second rack and pinion move by turning about the first joints within the rear wheel module. Accordingly, the rear links are diagonally arranged to be symmetrical to the front links in the plan view of the autonomous vehicle.

In another variant, in order to control the autonomous vehicle to perform a zero turn, the controller is configured to transmit a 3-1 control command, which allows the third motor to rotate in the first rotation direction, to the third motor, and transmit a moving-forward control command or a moving-rearward control command to the driving motor in a state in which arrangement structures of the front links and the rear links are diagonally arranged.

In another variant, the controller is further configured to stop the autonomous vehicle by stopping a transmission of the moving-forward control command or the moving-rearward control command when the autonomous vehicle performs a 90° zero turn, and transmit a 3-2 control command, which allows the third motor to rotate in a second rotation direction that is a direction opposite to the first rotation direction, to the third motor in order to arrange the front links and the rear links arranged in a diagonal state in a state of being parallel to the first and second rack and pinions.

In another variant, an autonomous driving vehicle in which the steering system is installed, includes at least a pair of in-wheel motors installed on left wheels and right wheels of at least one of the front wheels and the rear wheels. Base frames are coupled to the in-wheel motors.

One or more aspects of the subject disclosure include a steering method performed by the steering system described above. The steering method includes detecting an object nearby in a driving route by a recognition device and calculating a predicted curvature radius required for an autonomous vehicle to pass along a corresponding driving route, determining whether the calculated predicted curvature radius of the autonomous vehicle is smaller than a first minimum curvature radius according to a steering operation of the front wheel module, determining whether a direction of a driving route after the autonomous vehicle passes the object is parallel to a direction of a driving route before the autonomous vehicle passes the object when the predicted curvature radius is not smaller than the first minimum curvature radius according to the steering operation of the front wheel module, controlling, by the controller, the steering operation of the front wheel module in order for the autonomous vehicle to turn by the front wheels when the direction of the driving route after the autonomous vehicle passes the object is not parallel to the direction of the driving route before the autonomous vehicle passes the object, and controlling, by the controller, steering operations of the front wheel module and a rear wheel module in order for the autonomous vehicle to diagonally driving when the direction of the driving route after the autonomous vehicle passes the object is parallel to the direction of the driving route before the autonomous vehicle passes the object.

In at least one variant, the steering method further includes determining whether the calculated predicted curvature radius of the autonomous vehicle is smaller than a second minimum curvature radius according to a steering operation of the rear wheel module, controlling, by the controller, the steering operation of the front wheel module and the steering operation of the rear wheel module when the calculated predicted curvature radius of the autonomous vehicle is smaller than the first minimum curvature radius according to the steering operation of the front wheel module and is not smaller than the second minimum curvature radius according to the steering operation of the rear wheel module, and after operation, controlling, by the controller, the front wheel module, the rear wheel module, and a longitudinal axis module of the autonomous vehicle to perform a zero turn at a position close to the object before the autonomous vehicle passes the object when the calculated predicted curvature radius of the autonomous vehicle is smaller than the second minimum curvature radius according to the steering operation of the rear wheel module. The second minimum curvature radius is smaller than the first minimum curvature radius.

A steering system for an autonomous vehicle according to various embodiments of the present disclosure allows a pair of wheels of at least one of front wheels and rear wheels of the autonomous vehicle to perform all of right steering, left steering, and inward steering. Therefore, the autonomous vehicle equipped with the steering system can perform all of a left turn, a right turn, a left/right diagonal driving, and a zero turn.

As a result, the steering system can effectively allow the autonomous vehicle to driving without collision in various driving environments having various widths and curvatures. The effects obtainable from the present disclosure are not limited to the above-described effects, and other effects that are not mentioned will be able to be clearly understood by those skilled in the art to which the disclosure pertains from the following description.

Since a steering system according to embodiments of the present disclosure has a structure that can be applied to a manned/unmanned autonomous vehicle to simply control steering of front/rear wheels, high industrial applicability is expected.

BRIEF DESCRIPTION OF THE DRAWINGS

In order to more clearly describe embodiments of the present disclosure or technical solutions of the related art, drawings necessary for describing the embodiments are briefly introduced below. It should be understood that the drawings below are for the purpose of describing the embodiments of this specification and are not intended to limit the embodiments. In addition, for clarity of description, some elements to which various modifications are applied, such as exaggeration and omission, may be illustrated in the drawings below.

DETAILED DESCRIPTION

Figure 1:
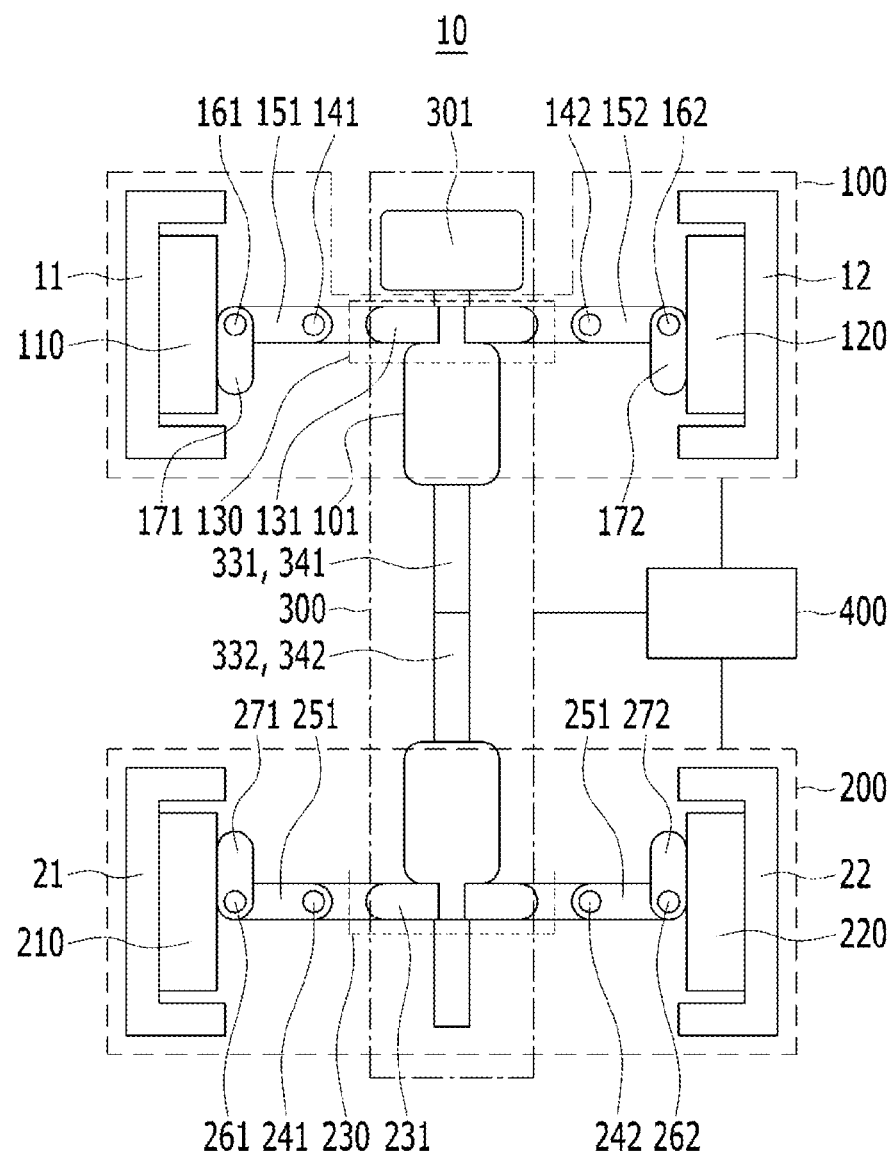
FIG. 1 is a configuration diagram of a steering system of an autonomous vehicle according to one aspect of the present disclosure.

Hereinafter, embodiments of the present disclosure will be described in detail with reference to the accompanying drawings.

However, it should be understood that this disclosure is not intended to limit the disclosure to specific embodiments and includes various modifications, equivalents, and/or alternatives of the embodiments of the disclosure. In the description of the drawings, like reference numerals may be used for like components.

In this specification, terms such as "has," "may have," "includes," and "may include" refer to the presence of the corresponding feature (e.g., a component such as a number, a function, an operation, a step, a part, an element and/or a component) and does not preclude the presence or addition of an additional feature.

When a certain component is described as being "connected" or "coupled" to another component, it should be understood that the certain component may be directly connected or coupled to another component, but other components may be present therebetween. On the other hand, when a certain component is described as being "directly connected" or "directly coupled" to another component, it should be understood that other components are not present therebetween.

Terms such as "first" and "second" used in various embodiments may indicate various components regardless of order and/or importance and do not limit the corresponding components. The above terms may be used to distinguish one component from another component. For example, the first component and the second component may indicate different components regardless of order or importance.

Embodiments of a singular expression used in this specification also include embodiments of a plural expression unless phrases related to the singular expression clearly indicate the opposite meaning.

The term "configured (or set) to" may be used interchangeably with, for example, "suitable for," "having the capacity to," "designed to," "adapted to," "made to," or "capable of" according to situations. The term "configured (or set) to" may not necessarily mean only "specifically designed to" in hardware. Instead, in a certain situation, the expression "a device configured to" may mean that the device is "capable of" together with other devices or parts. For example, the phrase "processor configured (or set) to perform A, B, and C" may be a dedicated processor (e.g., an embedded processor) for performing the corresponding operation, or a general-purpose processor (e.g., a central processing unit (CPU) or an application processor) capable of performing the corresponding operations by executing one or more software programs stored in a memory device.

Terms including technical or scientific terms used in the present disclosure may have the same meaning as commonly understood by those skilled in the art described in the present disclosure. Among the terms used in the present disclosure, terms defined in a general dictionary may be construed as meanings that is the same as or similar to the meanings in the context of the related art, and are not construed as an ideal or excessively formal meanings unless explicitly defined in the present disclosure. In some cases, even terms defined in the present disclosure may not be construed to exclude embodiments of the present disclosure.

In this specification, an inward indicates a direction toward an inside of an autonomous vehicle and an outward indicates a direction toward an outside of the autonomous vehicle. When front wheels of an autonomous vehicle turn left, it may mean that a left wheel of the front wheels turns outward and a right wheel thereof turns inward.

FIG. 1 is a configuration diagram of a steering system for an autonomous vehicle according to one aspect of the present disclosure.

In various embodiments, a steering system 10 for an autonomous vehicle may be installed in an autonomous vehicle having front wheels and rear wheels.

The autonomous vehicle is not limited to a car or other vehicle on which people may board and is a transportation which can perform a zero turn to be described below used in a construction field, an agriculture field, a landscaping field, and a military field. For example, the autonomous vehicle may be a small unmanned autonomous vehicle of which driving is remotely controlled, such as a lawn mower or an unmanned delivery robot.

In various embodiments of the present disclosure, the autonomous vehicle may be an in-wheel motor-driven autonomous vehicle in which in-wheel motors 110, 120, 210, and 220 are installed. A driving motor for providing a rotation power to at least one of the front wheels and the rear wheels is implemented as an in-wheel motor.

The in-wheel motors 110, 120, 210, and 220 are coupled to inner sides of left and right wheels 11, 12, 21, and 22 of the front wheels and the rear wheels and installed on a body by a suspension arm. In the embodiments, when a specific component is connected to a wheel such as a front wheel or a rear wheel, it means that the specific component is connected to the in-wheel motor 110, 120, 210, or 220 installed at the inner side of the wheel.

In-wheel motors mounted on an electric autonomous vehicle, which are available in the pertinent technical field, may be utilized as various in-wheel motors 110, 120, 210, and 220.

In addition, referring to FIG. 1, the steering system 10 for an autonomous vehicle may include a front wheel module 100 configured to steer the front wheels of the autonomous vehicle through rotation power of a first motor 101, a rear wheel module 200 configured to steer the rear wheels of the autonomous vehicle through rotation power of a second motor 201, a longitudinal axis module 300 configured to steer the front wheels and the rear wheels of the autonomous vehicle inward through rotation power of a third motor 301, and a controller 400 for controlling the first to third motors 101, 201, and 301.

In various embodiments, the controller 400 includes a processor and a memory. The controller 400 controls the first to third motors 101, 201, and 301 to generate the rotation power of the control target motor 101, 201, or 301. In addition, the controller 400 is configured to control a driving motor for providing rotation power to at least one of the front wheels and the rear wheels, such as the in-wheel motors 110, 120, 210, and 220.

The controller 400 may be implemented as an engine control unit (ECU) embedded in an autonomous vehicle to control components inside the autonomous vehicle by wire. However, the present disclosure is not limited thereto, and the controller 400 may be implemented as a controller separately from the ECU according to embodiments.

In some embodiments, the controller 400 may be further configured to control operations of the in-wheel motors 110, 120, 210, and 220 by calculating torque outputs to be applied to the in-wheel motors 110, 120, 210, and 220 according to the steering target angle information and the target torque information when receiving steering target angle information and target torque information.

In some embodiments, the controller 400 may receive the steering target angle information and the target torque information from a sensor installed on a steering wheel of the autonomous vehicle to detect steering manipulation information. A target steering angle and a target torque may be input to the controller 400 by manipulating the steering wheel.

In some other embodiments, the autonomous vehicle may be an autonomous driving vehicle in which an autonomous driving program is installed. Then, the controller 400 may receive the steering target angle information and the target torque information for each position on a driving route from an external device connected to the controller 400 via wired/wireless electrical communication. When receiving an autonomous driving instruction from an external input device, the controller 400 may receive the steering target angle information and the target torque information through the autonomous driving instruction.

In some other embodiments, the autonomous vehicle or the steering system 10 may further include a component for autonomous driving. The autonomous vehicle or the steering system 10 includes a recognition device capable of recognizing an obstacle on a driving route. The recognition device may include one or more of a light detection and ranging (LiDAR) sensor, an image sensor, a camera module, and other sensors capable of recognizing an obstacle. The autonomous driving program includes an instruction that allows the controller 400 to control at least one of the modules 100, 200, and 300 by analyzing an image captured by the recognition device.

First, an operation of the front wheel module 100 will be described.

Figure 2A:
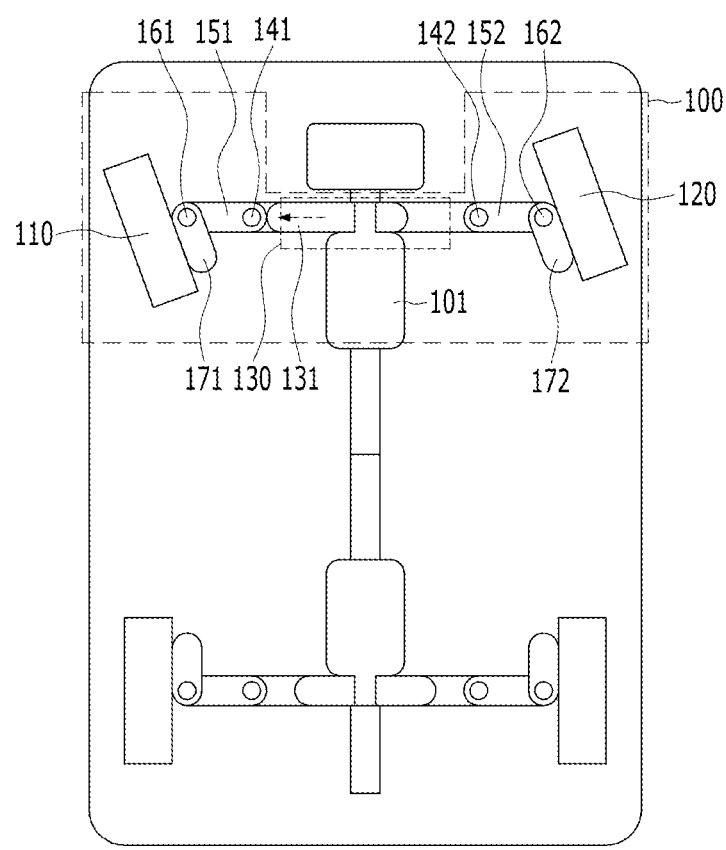
FIG. 2A depicts one exemplary control operation of a front wheel module to left turn according to various embodiments of the present disclosure.
Figure 2B:
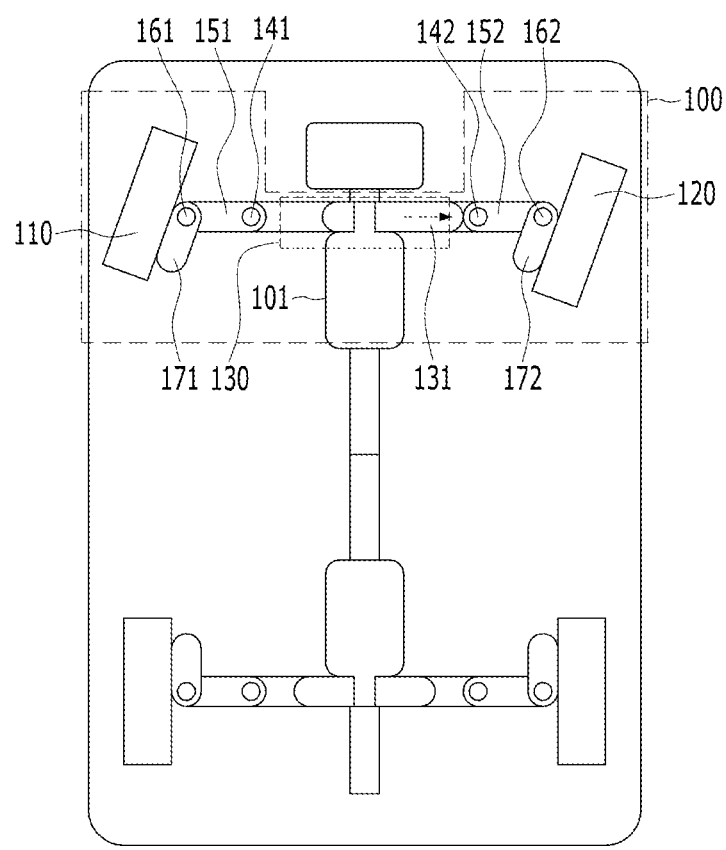
FIG. 2B depicts another exemplary control operation of a front wheel module to right turn according to various embodiments of the present disclosure.

FIGS. 2A and 2B are views for describing control operations of a front wheel module to left turn, right turn according to various embodiments of the present disclosure.

Referring to FIGS. 2A and 2B, the front wheel module 100 includes a rack and pinion 130 installed between a left wheel 11 and a right wheel 12 of the front wheels (shown in FIG. 1), front links 151 and 152 of which one ends are connected to both ends of the rack and pinion 130 through joints 141 and 142, and base frames 171 and 172 of which one ends are connected to the other ends of the front links 151 and 152 through joints 161 and 162 and for supporting the left wheel 11 and the right wheel 12 of the front wheels.

The first motor 101 operates as a steering motor of the front wheels. When receiving a control command from the controller 400, the first motor 101 is driven according to the control command to generate rotation power for steering the front wheels to a left side or a right side. The first motor 101 is coupled to a pinion gear of the rack and pinion 130 thereunder to supply rotation power to the pinion gear of the rack and pinion 130.

The rack and pinion 130 is installed between the in-wheel motors 110 and 220. In some embodiments, the rack and pinion 130 may be installed on a center link connecting the front links 151 and 152.

The rack and pinion 130 has a rack gear 131 (hereinafter referred to as "rack") moving to a left side or a right side by the rotation power of the first motor 101 to steer the front wheels. Specifically, the rack and pinion 130 has the rack gear 131 and a pinion gear. The rack and pinion 130 is configured to move the rack 131 to the left side or the right side when the pinion gear is driven by the rotation power of the first motor 101. When the first motor 101 rotates in a first rotation direction, the rack 131 may move to the left side, and when the first motor 101 rotates in a second rotation direction that is a direction opposite to the first rotation direction, the rack 131 may move to the right side. The first rotation direction may be set clockwise or counterclockwise.

The front links 151 and 152 connect the rack and pinion 130 to the base frames 171 and 172 to transmit a steering control force according to the movement of the rack 131 to the base frames 171 and 172.

The joints 141 and 142 are coupled to the rack and pinion 130 and the front links 151 and 152 so that the steering control force according to the movement of the rack 131 is transmitted to the base frames 171 and 172 through the front links 151 and 152 without turning about a coupling axis when the rack 131 moves in a left or right direction.

As described in FIGS. 9A and 9B below, the front links 151 and 152 connected to the rack and pinion 130 through the joints 141 and 142 are coupled to move in a longitudinal direction of the autonomous vehicle according to the movement of the rack and pinion 130 when the rack and pinion 130 moves forward or rearward of the autonomous vehicle. The joints 141 and 142 may be implemented in a hinge joint structure connecting both ends of the rack and pinion 130 to one end (i.e., inner end) of each of the front links 151 and 152. In some embodiments, steering angles of the joints 141 and 142 may depend on extension lengths of the ball screw cases 341 and 342 to be described below with reference to FIGS. 9A and 9B.

The base frames 171 and 172 are coupled to the in-wheel motors 110 and 120 to support the left wheel 11 and the right wheel 12 of the front wheels. The steering control force according to the left or right movement of the rack 131 is transmitted to the in-wheel motors 110 and 120 and left/right wheels 21 and 22 of the rear wheel through the base frames 171 and 172. When the base frames 171 and 172 turn about the joints 161 and 162, the in-wheel motors 110 and 120 and the left/right wheels 11 and 12 of the front wheels coupled thereto are steered in turning directions of the base frames 171 and 172.

The joints 161 and 162 are coupled to the other ends (i.e., outer ends) of the front links 151 and 152 and the base frames 171 and 172 to turn about the coupling axis when the steering control force generated by the movement of the rack 131 in the left or right direction is applied thereto. The joints 161 and 162 are coupled to the front links 151 and 152 and the base frames 171 and 172 so that the base frames 171 and 172 turn at a pre-designed steering angle.

Figure 3A:
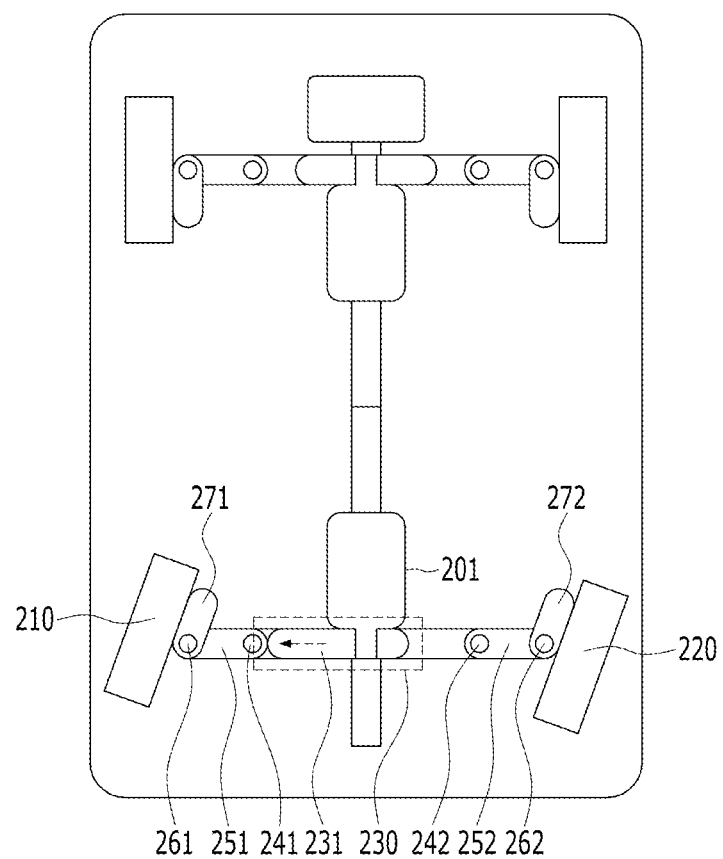
FIG. 3A depicts left/right steering control operations of a rear wheel module to right turn according to various embodiments of the present disclosure.
Figure 3B:
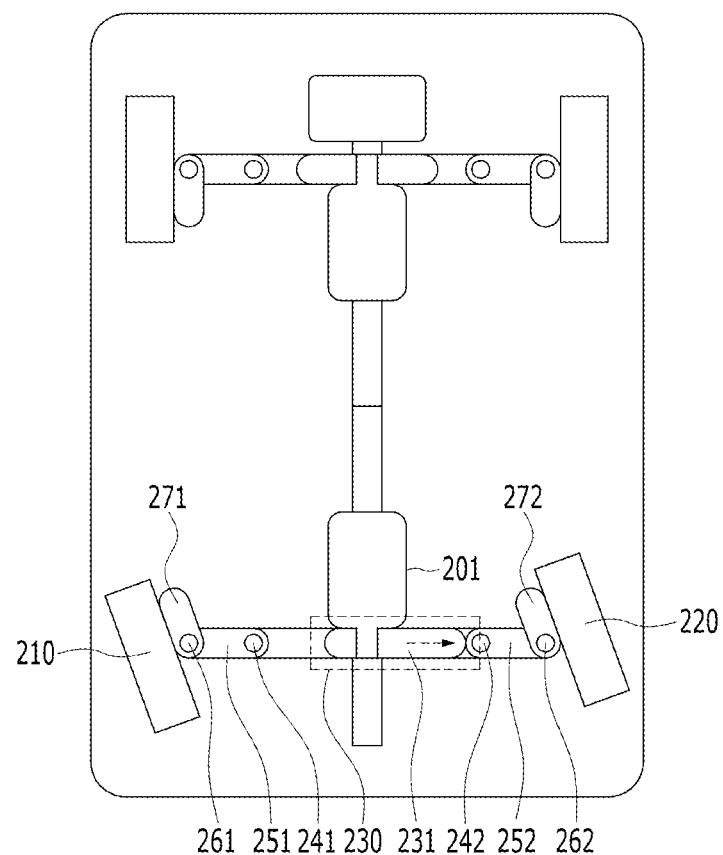
FIG. 3B depicts another left/right steering control operations of the rear wheel module to left turn according to various embodiments of the present disclosure.

FIGS. 3A and 3B are views for describing left/right steering control operations of a rear wheel module to left turn, right turn according to various embodiments of the present disclosure.

Referring to FIGS. 3A and 3B, the rear wheel module 200 includes a rack and pinion 230 installed between a left wheel 21 and a right wheel 22 of the rear wheels (as shown in FIG. 1), rear links 251 and 252 of which one ends are connected to both ends of the rack and pinion 230 through joints 241 and 242, and base frames 271 and 272 connected to the other ends of the rear links 251 and 252 through joints 261 and 262 and for supporting the left wheel 21 and the right wheel 22 of the rear wheels.

The second motor 201 operates as a steering motor of the rear wheels. When receiving a control command from the controller 400, the second motor 201 is driven according to the control command to generate rotation power for steering the rear wheels to a left side or a right side. The second motor 201 is coupled to a pinion gear of the rack and pinion 230 thereunder to supply rotation power to the pinion gear of the rack and pinion 230.

The rack and pinion 230 is installed between the in-wheel motors 210 and 220. In some embodiments, the rack and pinion 130 may be installed on a center link connecting the front links 151 and 152. The rack and pinion 230 has a rack gear 231 (hereinafter referred to as "rack") moving to a left side or a right side by the rotation power of the second motor 201 to steer the rear wheels. Specifically, the rack and pinion 230 has the rack gear 231 and the pinion gear. The rack and pinion 230 is configured to move the rack 231 to the left side or the right side when the pinion gear is driven by the rotation power of the second motor 201.

In some embodiments, the second motor 201 and the first motor 101 may be installed so that planar structures of the front wheel module 100 and the rear wheel module 200 are symmetrical to each other. As illustrated in FIG. 2, the first motor 101 may be installed closer to a center of the autonomous vehicle than the rack and pinion 130 is, and the second motor 201 may also be installed closer to the center of the autonomous vehicle than the rack and pinion 230 is.

Even when a control command for rotation in the same rotation direction is supplied from the controller 400 to the first motor 101 and the second motor 201 to rotate the first motor 101 and the second motor 201 in the same rotation direction, the rack 131 connected to the first motor 101 and the rack 231 connected to the second motor 201 may move in opposite directions. For example, when the first motor 101 rotates in the first rotation direction, the rack 131 may move to the left side, and when the second motor 201 rotates in the first rotation direction, the rack 231 may move to the right side. Alternatively, when the first motor 101 rotates in the second rotation direction that is a direction opposite to the first rotation direction, the rack 131 may move to the right side, and when the second motor 201 rotates in the second rotation direction, the rack 231 may move to the left side.

The rear links 251 and 252 connect the rack and pinion 230 to the base frames 271 and 272 to transmit a steering control force according to the movement of the rack 231 to the base frames 271 and 272.

The joints 241 and 242 are coupled to the rack and pinion 230 and the rear links 251 and 252 so that the steering control force according to the movement of the rack 231 is transmitted to the base frames 271 and 272 through the rear links 251 and 252 without turning about a coupling axis when the rack 231 moves in a left or right direction.

As described in FIGS. 9A and 9B below, the rear links 251 and 252 connected to the rack and pinion 230 through the joints 241 and 242 are coupled to move in a longitudinal direction of the autonomous vehicle according to the movement of the rack and pinion 230 when the rack and pinion 230 moves forward or rearward of the autonomous vehicle. The joints 241 and 242 may be implemented in a hinge joint structure connecting both ends of the rack and pinion 230 to one end (i.e., inner end) of each of the rear links 251 and 252. In some embodiments, steering angles of the joints 241 and 242 may depend on extension lengths of the ball screw cases 341 and 342 to be described below with reference to FIGS. 9A and 9B.

The base frames 271 and 272 are coupled to the in-wheel motors 210 and 220 to support the left wheel 21 and the right wheel 22 of the rear wheels. The steering control force according to the left or right movement of the rack 231 is transmitted to the in-wheel motors 210 and 220 and left/right wheels 21 and 22 of the rear wheels through the base frames 271 and 272. When the base frames 271 and 272 turn about the joints 261 and 262, the in-wheel motors 210 and 220 and the left/right wheels 21 and 22 of the rear wheels coupled thereto rotate in turn directions of the base frames 271 and 272.

The joints 261 and 262 are coupled to the front links 251 and 252 and the base frames 271 and 272 to turn about the coupling axis when the steering control force generated by the movement of the rack 231 in the left or right direction is applied thereto. The joints 261 and 262 are coupled to the rear links 251 and 252 and the base frames 271 and 272 so that the base frames 271 and 272 turn at a pre-designed steering angle.

The controller 400 may control the steering operation of the front wheel module 100 by transmitting the control command to the first motor 101 or control the steering operation of the rear wheel module 200 by transmitting the control command to the second motor 201. The controller 400 may control the steering operation of the front wheel module 100 or the rear wheel module 200 for left turn or right turn driving of the autonomous vehicle. In addition, the controller 400 may control the steering operation of the front wheel module 100 or the rear wheel module 200 for a reverse left turn or a reverse right turn of the autonomous vehicle.

In some embodiments, for a left turn of the autonomous vehicle, the controller 400 is configured to supply a 1-1 control command, which allows the rack 131 to move in the left direction by rotating the first motor 101 in the first rotation direction, to the first motor 101 or supply a 2-2 control command, which allows the rack 231 to move in the right direction by rotating the second motor 201 in the second rotation direction that is a direction opposite to the first rotation direction, to the second motor 201.

For example, when the 1-1 control command is supplied to the first motor 101, as illustrated in FIG. 2A, the rack 131 moves to the left side and thus the base frames 171 and 172 rotate about the joints 161 and 162, and as a result, the in-wheel motors 110 and 120 and the left/right wheels 11 and 12 of the front wheels are steered so that the autonomous vehicle turns left. Alternatively, when the 2-2 control command is supplied to the second motor 201, as illustrated in FIG. 3A, the rack 231 moves to the left side and thus the base frames 271 and 272 rotate about the joints 261 and 262, and as a result, the in-wheel motors 210 and 220 and the left/right wheels 21 and 22 of the rear wheels are steered so that the autonomous vehicle turns left.

In addition, for a right turn of the autonomous vehicle, the controller 400 is configured to supply a 1-2 control command, which allows the rack 131 to move in the right direction by rotating the first motor 101 in the second rotation direction that is a direction opposite to the first rotation direction, to the first motor 101 or supply a 2-1 control command, which allows the rack 231 to move in the left direction by rotating the second motor 201 in the first rotation direction, to the second motor 201.

For example, when the 1-2 control command is supplied to the first motor 101, as illustrated in FIG. 2B, the rack 131 moves to the right side and thus the base frames 171 and 172 rotate about the joints 161 and 162, and as a result, the in-wheel motors 110 and 120 connected to the base frames 171 and 172 and the left/right wheels 11 and 12 of the front wheels are steered so that the autonomous vehicle turns right. Alternatively, when the 2-1 control command is supplied to the second motor 201, as illustrated in FIG. 3B, the rack 231 moves to the right side and thus the base frames 271 and 272 rotate about the joints 261 and 262, and as a result, the in-wheel motors 210 and 220 connected to the base frames 171 and 172 and the left/right wheels 21 and 22 of the rear wheels are steered so that the autonomous vehicle turns right.

In some embodiments, the base frame 171 and the base frame 271 may have the same maximum turn angle range, and the base frame 172 and the base frame 272 may have the same maximum turn angle range. Then, a turning radius of the autonomous vehicle according to the 1-1 control command and a turning radius of the autonomous vehicle according to the 2-2 control command may be the same. In addition, a turning radius of the autonomous vehicle according to the 1-2 control command and a turning radius of the autonomous vehicle according to the 2-1 control command may be the same.

Figure 4:
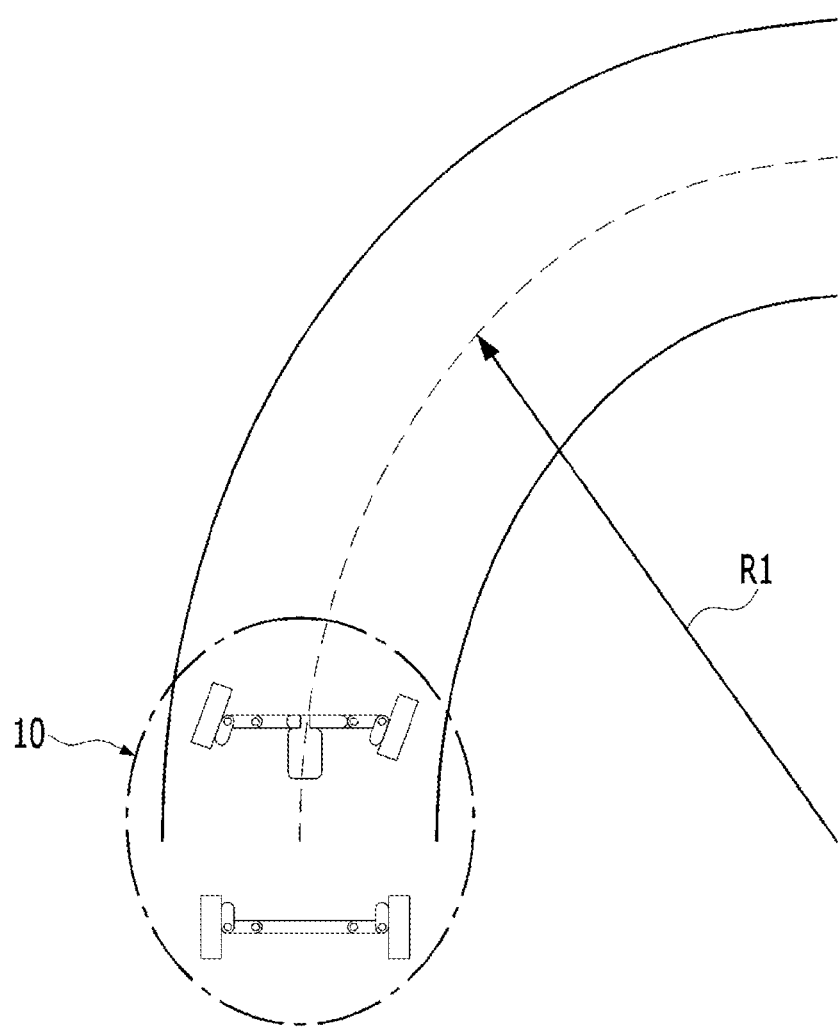
FIG. 4 is a view for describing a situation in which an autonomous vehicle driving along a general curved route according to the control operation of FIGS. 2A and 2B.

FIG. 4 is a view describing a situation in which an autonomous vehicle driving along a generally curved route according to the control operation of FIGS. 2A and 2B.

When the autonomous vehicle driving along a general curved route in which the autonomous vehicle may not driving without departure at a steering angle within a maximum steering angle range of the front wheels, the controller 400 may drive the first motor 101 to steer the left/right wheels 11 and 12 of the front wheels. When the controller 400 supplies the 1-2 control command to the first motor 101 upon driving along the general curved route having a curvature radius R1 illustrated in FIG. 4, the autonomous vehicle may stably drive along the general curved route.

In addition, although not illustrated, the controller 400 may drive the first motor 101 to steer the left/right wheels 11 and 12 of the front wheels so that the autonomous vehicle moves rearward along the general curved route.

In addition, the controller 400 may control the first motor 101 and the second motor 201 to enable more sharp rotation because a turning radius is shorter than that of a case of steering only the front wheels or steering only the rear wheels of the autonomous vehicle.

Figure 5A:
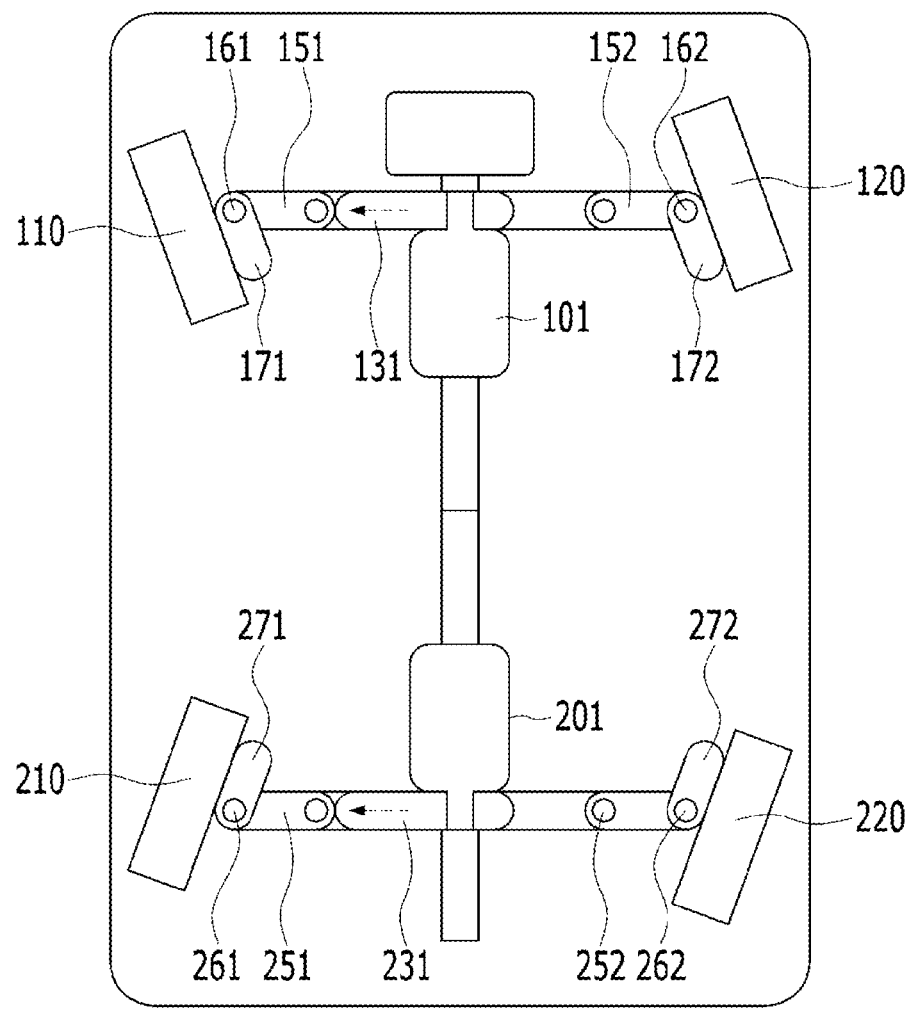
FIG. 5A depicts a control operation for performing a sharper left turn, right turn by steering front wheels and rear wheels according to various embodiments of the present disclosure.
Figure 5B:
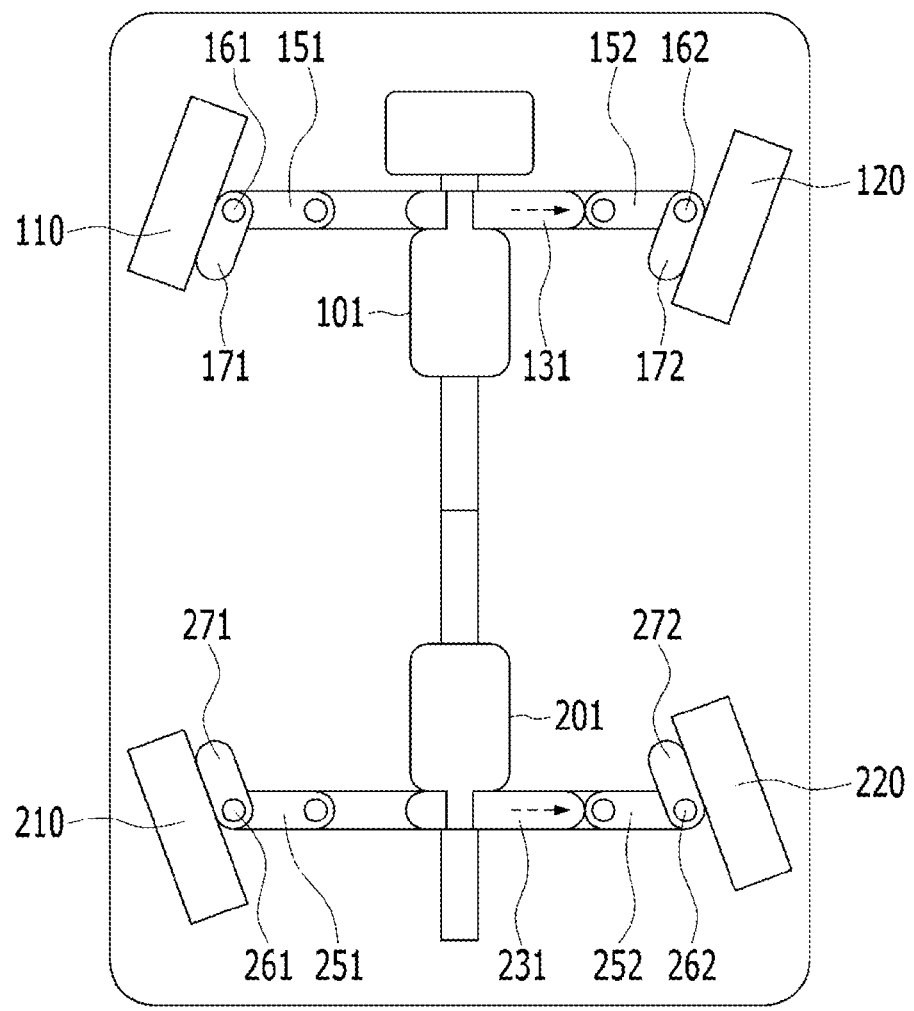
FIG. 5B depicts a control operation for performing a sharper right turn, left turn by steering front wheels and rear wheels according to various embodiments of the present disclosure.

FIGS. 5A and 5B are views for describing a control operation for performing a sharper left turn, light turn by steering front wheels and rear wheels according to various embodiments of the present disclosure.

Referring to FIGS. 5A and 5B, the controller 400 (shown in FIG. 1) may control the steering operation of the front wheel module 100 by transmitting the control command to the first motor 101 and control the steering operation of the rear wheel module 200 by transmitting the control command to the second motor 201. When the first motor 101 and the second motor 201 simultaneously provide rotation power, the turning radius of the autonomous vehicle further decreases. The steering operation of the rear wheel module 200 for such sharp rotation is for the rear wheel module 200 to rotate in the same direction as a direction in which the autonomous vehicle rotates according to the steering operation of the front wheel module 100.

In some embodiments, in order to further reduce a left-turn radius of the autonomous vehicle in which the steering system of FIG. 1 is installed, the controller 400 is configured to supply the 1-1 control command, which allows the rack 131 to move in the left direction by rotating the first motor 101 in the first rotation direction, to the first motor 101 and supply the 2-2 control command, which allows the rack 231 to move in the right direction by rotating the second motor 201 in the second rotation direction that is a direction opposite to the first rotation direction, to the second motor 201.

For example, when the 1-1 control command and the 2-2 control command are supplied to the motors 101 and 201, as illustrated in FIG. 5A, the rack 131 moves to the left side and thus the base frames 171 and 172 rotate about the joints 161 and 162, and the rack 231 moves to the right side and thus the base frames 271 and 272 rotate about the joints 261 and 262, and as a result, the in-wheel motors 110, 120, 210, and 220 and the left/right wheels 11, 12, 21, and 22 of the front wheels and the rear wheels are steered so that the autonomous vehicle turns left more sharply.

In addition, in order to further reduce a right-turn radius of the autonomous vehicle, the controller 400 is configured to supply the 2-2 control command, which allows the rack 131 to move in the right direction by rotating the first motor 101 in the second rotation direction that is a direction opposite to the first rotation direction, to the first motor 101 and supply the 2-1 control command, which allows the rack 231 to move in the left direction by rotating the second motor 201 in the first rotation direction, to the second motor 201.

For example, when the 1-2 control command is supplied to the first motor 101, as illustrated in FIG. 2B, the rack 131 moves to the right side and thus the base frames 171 and 172 rotate about the joints 161 and 162, and as a result, the in-wheel motors 110 and 120 connected to the base frames 171 and 172 and the left/right wheels 11 and 12 of the front wheels are steered so that the autonomous vehicle turns right. Alternatively, when the 2-1 control command is supplied to the second motor 201, as illustrated in FIG. 3B, the rack 231 moves to the right side and thus the base frames 271 and 272 rotate about the joints 261 and 262, and as a result, the in-wheel motors 210 and 220 connected to the base frames 271 and 272 and the left/right wheels 21 and 22 of the rear wheels are steered so that the autonomous vehicle turns right.

A steering angle according to the 1-1 control command and a steering angle according to the 2-2 control command may be the same or different. In addition, a steering angle according to the 1-2 control command and a steering angle according to the 2-1 control command may be the same or different.

Figure 6:
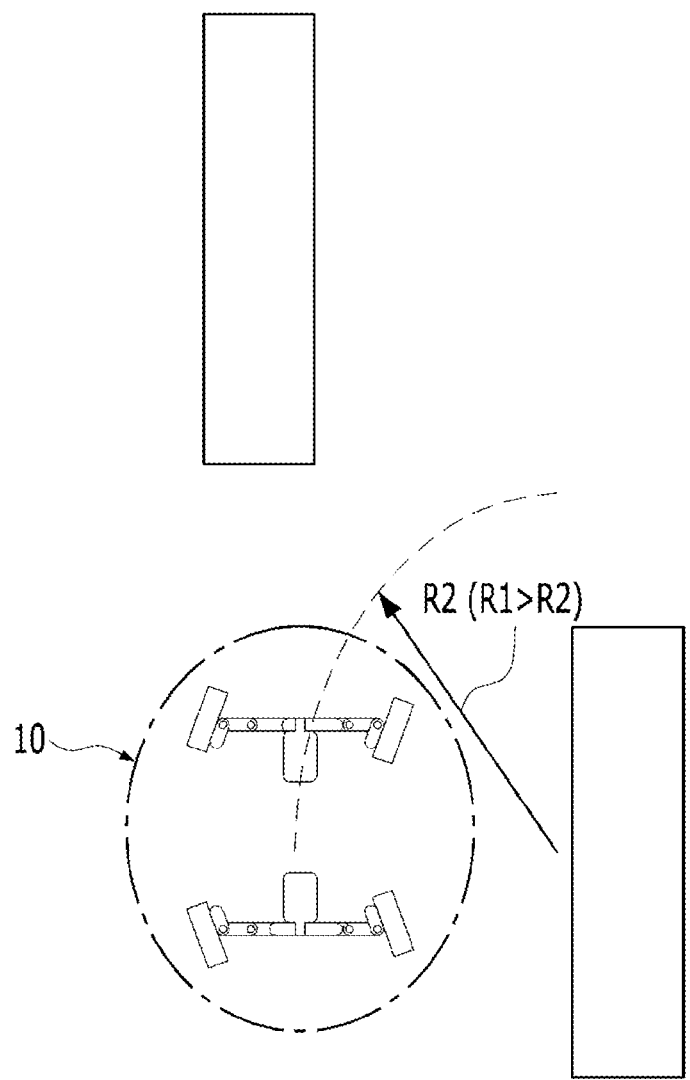
FIG. 6 is a view for describing a situation in which an autonomous vehicle driving along a curved route having a shorter curvature radius than the general curved route according to the control operation of FIGS. 5A and 5B.

As a result, by steering the left/right wheels 11 and 12 of the front wheels to the left side and steering the left/right wheels 21 and 22 of the rear wheels to the right side at the same time, it is possible to further reduce the left-turn radius or the right-turn radius of the autonomous vehicle than that of a case of steering only the front wheels or steering only the rear wheels. As a result, as illustrated in FIG. 6, the autonomous vehicle can stably drive without departure along a specific driving route in which the autonomous vehicle is inevitably departed in the case of steering only the front wheels or steering only the rear wheels due to a shorter curvature radius R2 (R1>R2) than the general driving route.

In addition, the controller 400 may control the first motor 101 and the second motor 201 for diagonal driving of the autonomous vehicle.

Figure 7A:
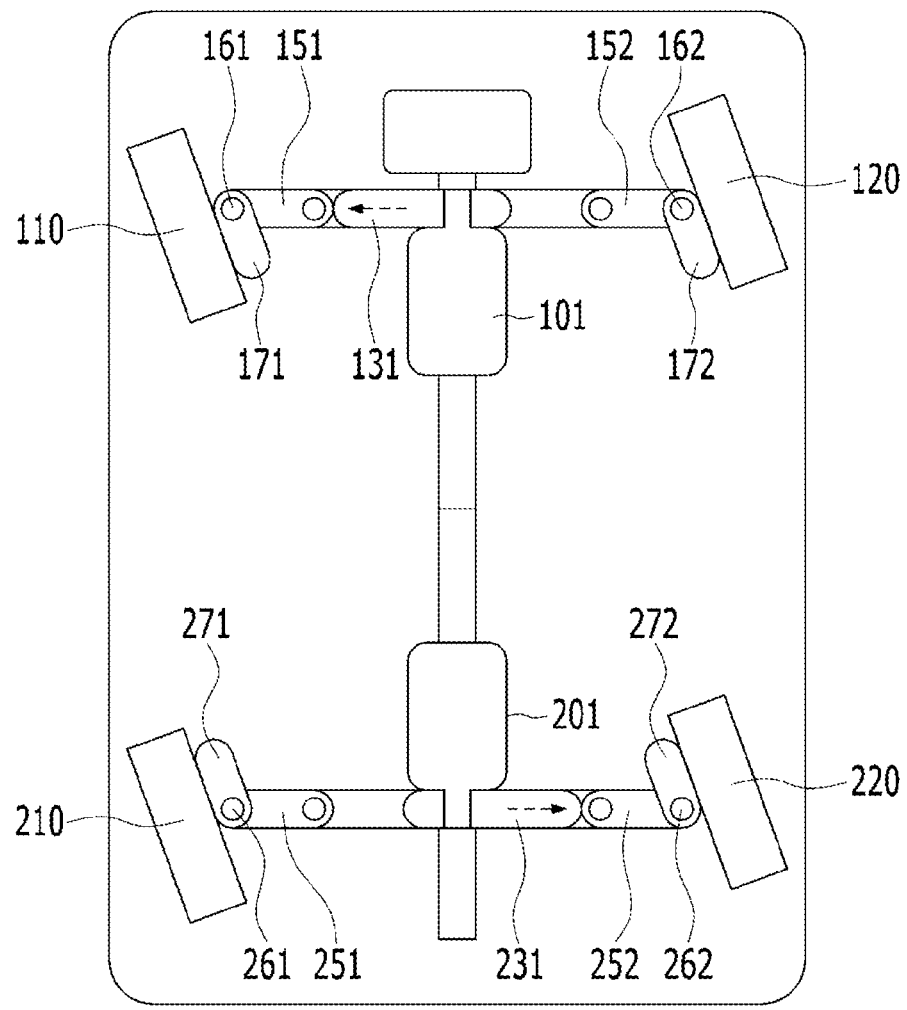
FIG. 7A depicts a control operation for left, right diagonal driving by steering the front wheels and the rear wheels according to various embodiments of the present disclosure.
Figure 7B:
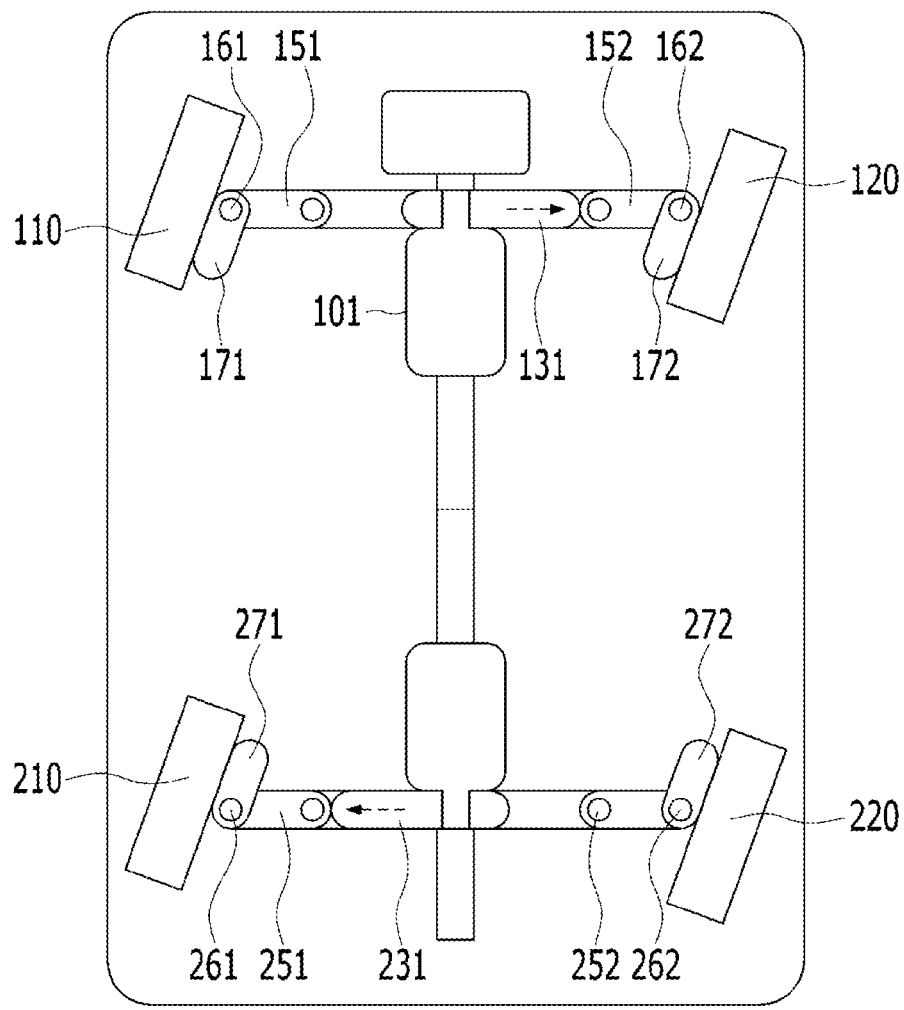
FIG. 7B depicts a control operation for left, right diagonal driving by steering the front wheels and the rear wheels according to various embodiments of the present disclosure.
Figure 8:
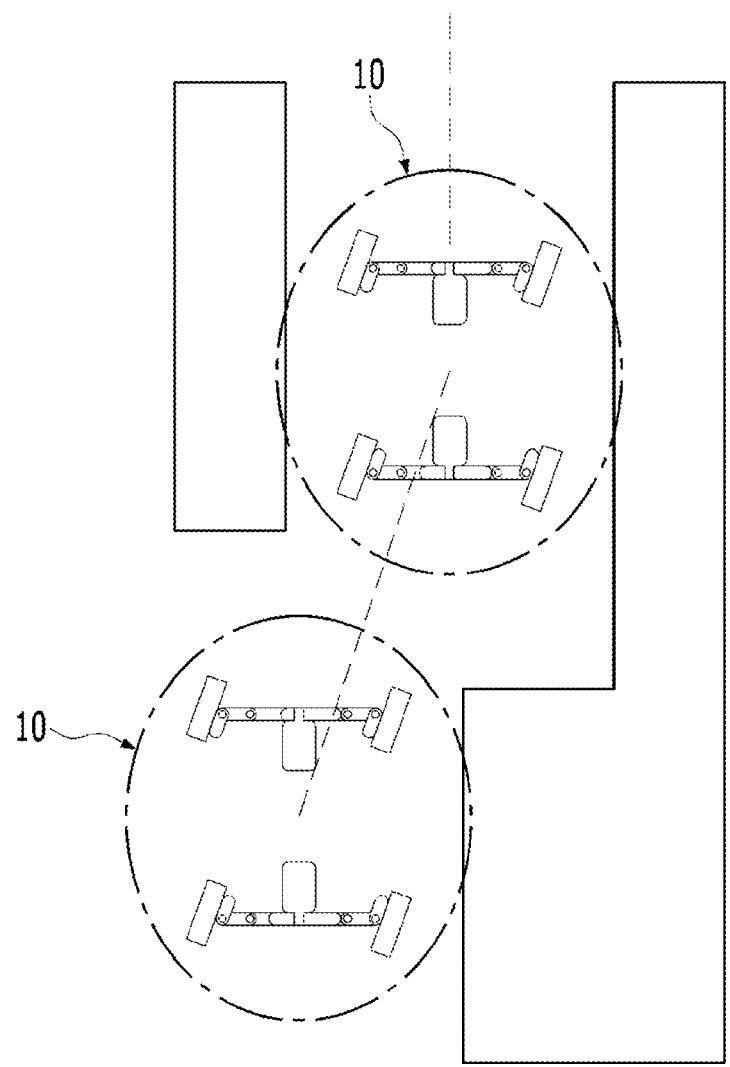
FIG. 8 is a view for describing a situation in which an autonomous vehicle diagonally driving according to the control operation of FIGS. 7A and 7B.

FIGS. 7A and 7B are views for describing a control operation for left, right diagonal driving by steering the front wheels and the rear wheels according to various embodiments of the present disclosure. FIG. 8 is a view for describing a situation in which an autonomous vehicle diagonally driving according to the control operation of FIG. 7.

Referring to FIGS. 7A and 7B, the controller 400 may control the steering operation of the front wheel module 100 by transmitting the control command to the first motor 101 and control the steering operation of the rear wheel module 200 by transmitting the control command to the second motor 201. When the first motor 101 and the second motor 201 simultaneously provide rotation power, the autonomous vehicle may diagonally drive. Here, the steering operation of the rear wheel module 200 and the steering operation of the front wheel module 100 for diagonal driving may be operations to have the same steering angle.

In some embodiments, in order for the autonomous vehicle to driving in a left diagonal direction, the controller 400 may be configured to supply the 1-1 control command, which allows the rack 131 to move in the left direction by rotating the first motor 101 in the first rotation direction, to the first motor 101 and supply the 2-2 control command, which allows the rack 231 to move in the right direction by rotating the second motor 201 in the second rotation direction that is a direction opposite to the first rotation direction, to the second motor 201. Here, the steering angle according to the 1-1 control command and the steering angle according to the 2-2 control command are parallel to each other. The steering angles are angles formed by the steered wheels from reference lines extending along the rack and pinions 130 and 230.

Then, as illustrated in FIG. 7A, the rack 131 moves to the left side and thus the base frames 171 and 172 rotate about the joints 161 and 162, and as a result, the in-wheel motors 110 and 120 connected to the base frames 171 and 172 and the left/right wheels 11 and 12 of the front wheels are steered toward a left diagonal. In addition, the rack 231 moves to the right side and thus the base frames 271 and 272 rotate about the joints 261 and 262, and as a result, the in-wheel motors 210 and 220 connected to the base frames 271 and 272 and the left/right wheels 21 and 22 of the rear wheels are steered toward the left diagonal.

In some embodiments, in order to driving the autonomous vehicle in a right diagonal direction, the controller 400 may be configured to supply the 1-2 control command, which allows the rack 131 to move in the right direction by rotating the first motor 101 in the second rotation direction, to the first motor and supply the 2-1 control command, which allows the rack 231 to move in the left direction by rotating the second motor 201 in the first rotation direction, to the second motor 201. Here, the steering angle according to the 1-2 control command and the steering angle according to the 2-1 control command are parallel to each other.

Then, as illustrated in FIG. 7B, the rack 131 moves to the right side and thus the base frames 171 and 172 rotate about the joints 161 and 162, and as a result, the in-wheel motors 110 and 120 connected to the base frames 171 and 172 and the left/right wheels 11 and 12 of the front wheels are steered toward a right diagonal. In addition, the rack 231 moves to the right side and thus the base frames 271 and 272 rotate about the joints 261 and 262, and as a result, the in-wheel motors 210 and 220 connected to the base frames 271 and 272 and the left/right wheels 21 and 22 of the rear wheels are steered toward the right diagonal.

As a result, as illustrated in FIG. 8, the autonomous vehicle may diagonally drive without collision along a route not allowing rotation.

In addition, the controller 400 may control the third motor 301 of the longitudinal axis module 300 in order for the autonomous vehicle to perform a zero turn.

Figure 9A:
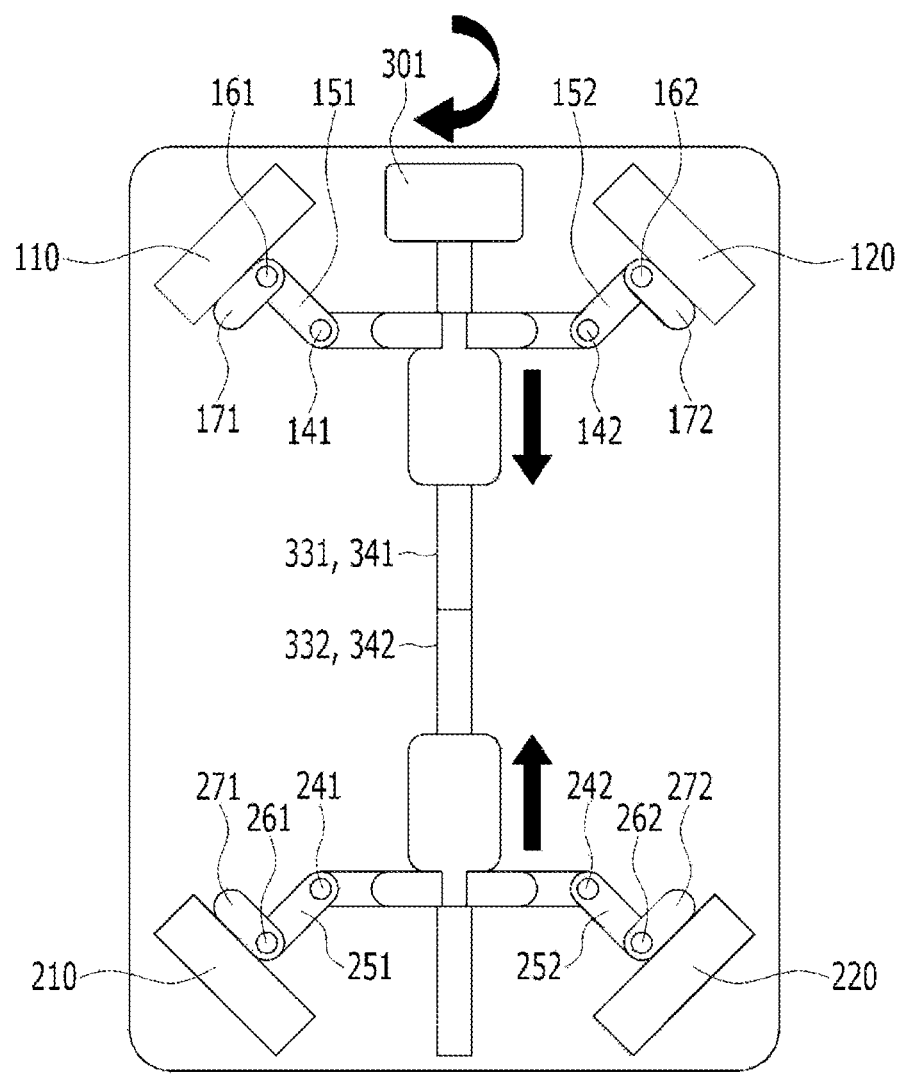
FIG. 9A depicts a control operation of a longitudinal axis module according to various embodiments of the present disclosure.
Figure 9B:
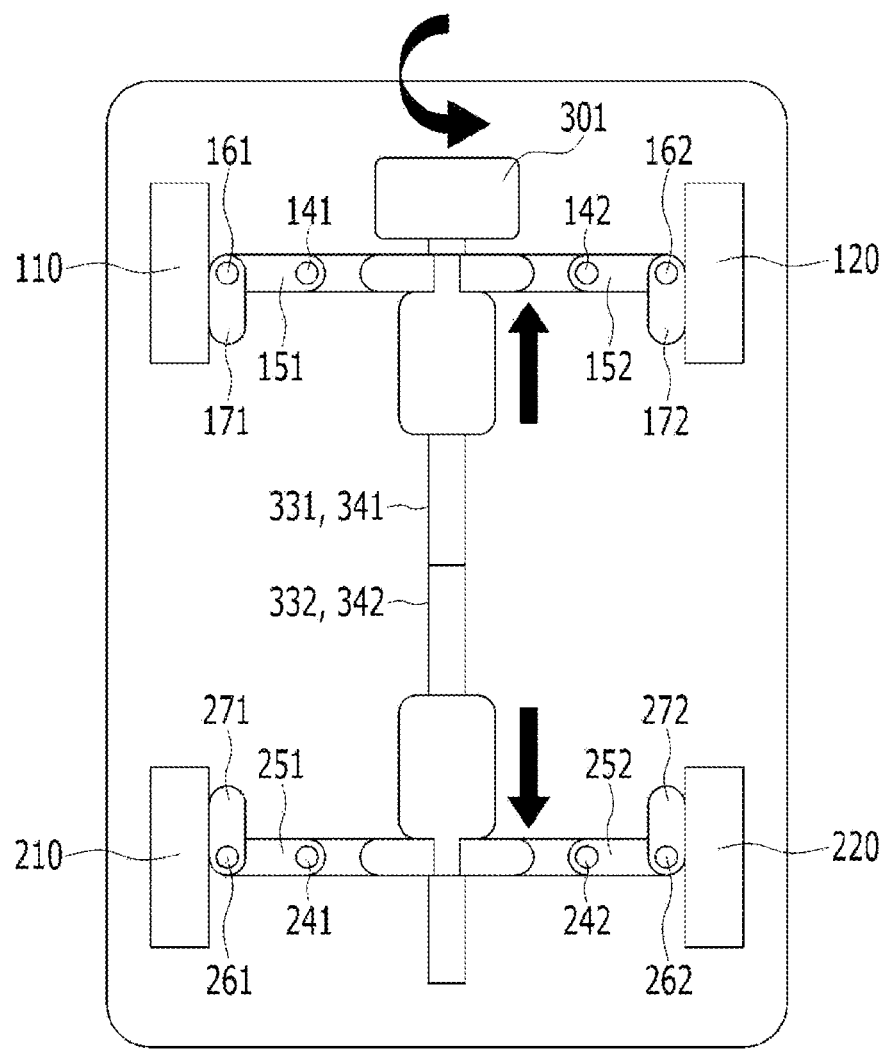
FIG. 9B depicts another control operation of the longitudinal axis module according to various embodiments of the present disclosure.

FIGS. 9A and 9B are views for describing a control operation of a longitudinal axis module according to various embodiments of the present disclosure.

The longitudinal axis module 300 is configured along a longitudinal axis of the autonomous vehicle to connect the front wheel module 100 to the rear wheel module 200. The longitudinal axis module 300 is configured to steer the left/right wheels 11 and 12 of the front wheels and the left/right wheels 21 and 22 of the rear wheels of the autonomous vehicle inward through the rotation power of the third motor 301. Specifically, the longitudinal axis module 300 is configured so that the front wheel module 100 and the rear wheel module 200 partially move along the longitudinal axis through the rotation power of the third motor 301 to eventually steer the front wheels and the rear wheels of the autonomous vehicle inward.

The third motor 301 operates as a motor for steering the front wheels and the rear wheels inward. The inward steering of the front wheels is to perform steering so that the front of each of the left/right wheels 11 and 12 of the front wheels are narrowed inward and the rear thereof are widened outward. The inward steering of the rear wheels is to perform steering symmetrical to the inward steering of the front wheels and is to perform steering so that the front of each of the left/right wheels 21 and 22 of the rear wheels widens outward and the rear thereof narrows inward.

In various embodiments of the present disclosure, the longitudinal axis module 300 is configured to simultaneously steer the front wheels and the rear wheels inward when the third motor 301 rotates in the first direction. Specifically, the longitudinal axis module 300 includes the third motor 301 for generating rotation power, a ball screw 331 coupled to the third motor 301 so that the ball screw 331 rotates according to the rotation power of the third motor 301, a ball screw case 341 coupled to the ball screw 331 to move an extending axis of the ball screw 331 when the ball screw 331 rotates, a ball screw 332 coupled to the ball screw 331 so that the ball screw 332 rotates according to the rotation of the ball screw 331, and a ball screw case 342 coupled to the ball screw 332 to move along an extending axis of the ball screw 332 when the ball screw 332 rotates.

The longitudinal axis module 300 includes the ball screw 332 having one end of the ball screw 332 connected to the other end of the ball screw 331, and the ball screw case 342 coupled to the rack and pinion 230 so that the rack and pinion 232 moves rearward or forward according to the rotation of the ball screw 332.

The ball screws 331 and 332 are screws configured to linearly transfer a female screw while balls inside a nut move when a screw shaft rotates. A driving torque of the ball screw does not extremely become large as much as that of a sliding screw so that an axial clearance is easily kept small. In addition, there is an advantage in that a lifetime also increases due to less wear.

The ball screw cases 341 and 342 are coupled to the ball screws 331 and 332 so that the corresponding ball screw cases 341 and 342 move along the extending axes of the ball screws 331 and 332 when the ball screws 331 and 332 rotate. In some embodiments, the ball screw cases 341 and 342 may be installed along diameters of ball nuts of the ball screws 331 and 332 and configured to have lengths of the cases greater than lengths of the ball nuts. For example, the ball screw cases 341 and 342 may be cylindrical cases surrounding the ball nuts. In some other embodiments, the ball nuts of the ball screws 331 and 332 may be used as the ball screw cases 341 and 342. In this case, as illustrated in FIG. 9, the ball nuts are implemented to extend to a portion in which the rack and pinions 130 and 230 are installed and have lengths in which the ball nuts are coupled to the rack and pinions 130 and 230.

As illustrated in FIGS. 9A and 9B, when the ball screws 331 and 332 connect the front wheel module 100 to the rear wheel module 200 to extend along the longitudinal axis of the autonomous vehicle, the ball screw cases 341 and 342 may move to the front or rear of the autonomous vehicle.

One end of the ball screw 331 is connected to the third motor 301. The one end of the ball screw 331 may be connected to the third motor 301 so that the ball screw 331 rotates in synchronization with the rotation of the third motor 301. When the third motor 301 rotates, the ball screw 331 also rotates accordingly. When the ball screw 331 rotates, the ball screw case 341 also moves to the front or rear of the autonomous vehicle.

One end of the ball screw 332 is connected to the other end of the ball screw 331, and when the ball screw 331 rotates, the ball screw 332 also rotates accordingly. The ball screws 331 and 332 are connected to each other so that the rotations of the ball screws 331 and 332 are synchronized. When the ball screw 332 rotates, the ball screw case 342 also moves to the front or rear of the autonomous vehicle.

In various embodiments of the present disclosure, when the ball screw 331 rotates in synchronization with the ball screw case 341 and thus the ball screw case 341 moves in a first direction, the ball screw case 342 may be coupled to the ball screw case 341 to rotate in a second direction that is a direction opposite to the first direction. For example, the ball screw 331 and the ball screw case 341 may be implemented as a forward ball screw and a case thereof, and the ball screw 332 and ball screw case 342 may be implemented as a reverse ball screw and a case thereof.

In this coupling relationship, when the third motor 301 rotates in a first rotation direction, the ball screws 331 and 332 also rotate. When the ball screw 331 rotates, as illustrated in FIG. 9A, the ball screw case 341 moves in the rear direction of the autonomous vehicle, and thus the rack and pinion 130 also moves in the rear direction of the autonomous vehicle. Meanwhile, since the ball screw case 342 is coupled to move in a direction opposite to that of the ball screw case 341, when the ball screw 332 rotates in synchronization with the ball screw 331, as illustrated in FIG. 9A, the ball screw case 342 moves in the front direction of the autonomous vehicle, and as a result, the rack and pinion 230 also moves in the front direction of the autonomous vehicle.

Meanwhile, when the third motor 301 rotates in a second rotation direction that is a direction opposite to the first rotation direction, the ball screws 331 and 332 also rotate in a direction opposite to the direction of FIG. 9A. When the ball screw 331 rotates in the direction opposite to the direction of FIG. 9A, as illustrated in FIG. 9B, the ball screw case 341 moves in the front direction of the autonomous vehicle, and thus the rack and pinion 130 also moves in the front direction of the autonomous vehicle. Due to the coupling structure between the ball screw case 342 and the ball screw case 341, when the ball screw 332 rotates in synchronization with the ball screw 331, as illustrated in FIG. 9B, the ball screw case 342 moves in the rear direction of the autonomous vehicle, and as a result, the rack and pinion 230 also moves in the rear direction of the autonomous vehicle.

The ball screw cases 341 and 342 are coupled to the rack and pinions 130 and 230. In various embodiments of the present disclosure, the ball screw cases 341 and 342 may be coupled to the rack and pinions 130 and 230 at right angles. The rack and pinions 130 and 230 move in axial directions of the ball screws 331 and 332 in a horizontal state.

The ball screw case 341 is coupled to the rack and pinion 130 so that the rack and pinion 130 moves to the front or rear of the autonomous vehicle according to the rotation of the ball screw 331. The ball screw case 342 is coupled to the rack and pinion 230 so that the rack and pinion 230 moves along the extending axis according to the rotation of the ball screw 332.

Due to the joints 141 and 142 coupled to both ends of the rack and pinions 130 and 230, the rack and pinions 130 and 230 move along the extending axes of the ball screws 331 and 332 in response to the movement of the ball screw cases 341 and 342.

That is, when the third motor 301 rotates in the first rotation direction, as illustrated in FIG. 9A, the ball screw cases 341 and 342 and the rack and pinions 130 and 230 move to a central portion of the autonomous vehicle, and when the third motor 301 rotates in the second rotation direction that is a direction opposite to the first rotation direction, as illustrated in FIG. 9B, the ball screw cases 341 and 342 and the rack and pinions 130 and 230 move forward or rearward of the autonomous vehicle again.

In a state in which the front/rear wheels of the autonomous vehicle are aligned at a steering angle of 0° as illustrated in FIG. 1, the front links 151 and 152 and the rack and pinion 130 are arranged parallel to each other.

When the third motor 301 rotates, the rack and pinion 130 easily moves by the joints 141 and 142. When the rack and pinion 130 moves toward the rear of the autonomous vehicle in the horizontal state, the one ends of the front links 151 and 152 connected to the rack and pinion 130 in the front wheel module 100 also move by turning about the joints 141 and 142. Since the joints 161 and 162 connect the base frames 171 and 172 to the front links 151 and 152 to prevent the base frames 171 and 172 from turning when the steering control force in the left or right direction of the rack and pinion 130 is not applied thereto, even when the front links 151 and 152 move according to the rotation of the third motor 301, the base frames 171 and 172 do not turn about the joints 161 and 162, and angles between the base frames 171 and 172 and the front links 151 and 152 are fixed. That is, when the rack and pinion 130 moves according to the rotation of the third motor 301, the angles between the base frames 171 and 172 and the front links 151 and 152 may not be changed from the fixed state. As a result, since the one ends of the front links 151 and 152 relatively further move toward the rear of the autonomous vehicle than the other ends of the front links 151 and 152 connected to the base frames 171 and 172, as illustrated in FIG. 9A, the front links 151 and 152 are arranged diagonally in a plan view of the autonomous vehicle.

Likewise, when the third motor 301 rotates, the rack and pinion 230 easily moves by the joints 241 and 242. When the rack and pinion 230 moves toward the front of the autonomous vehicle in the horizontal state, the rack and pinion 230 turns about the joints 241 and 242 in the rear wheel module 200, and thus the one ends of the rear links 251 and 252 connected to the rack and pinion 230 also move. Since the joints 261 and 262 connect the base frames 271 and 272 to the rear links 251 and 252 to prevent the base frames 271 and 272 from turning when the steering control force in the left or right direction of the rack and pinion 230 is not applied thereto, even when the rear links 251 and 252 move according to the rotation of the third motor 301, the base frames 271 and 272 do not turn about the joints 261 and 262, and angles between the base frames 271 and 272 and the rear links 251 and 252 are fixed. That is, when the rack and pinion 230 moves according to the rotation of the third motor 301, the angles between the base frames 271 and 272 and the rear links 251 and 252 may not be changed from the fixed state. As a result, since the one ends of the rear links 251 and 252 relatively further move toward the rear of the autonomous vehicle than the other ends of the rear links 251 and 252 connected to the base frames 271 and 272, as illustrated in FIG. 9A, the rear links 251 and 252 are arranged diagonally in the plan view of the autonomous vehicle. In this case, the rear links 251 and 252 and the front links 151 and 152 move in a diagonal arrangement symmetrical to each other.

Meanwhile, when the third motor 301 rotates in the second rotation direction that is a direction opposite to the rotation direction of FIG. 9A, the coupling relationship between the rack and pinions 130 and 230 and the links 151, 152, 251, and 252 changed in the planar structures of FIG. 9A is re-arranged parallel to each other as illustrated in FIG. 9A.

The controller 400 may allow the autonomous vehicle equipped with the steering system 1 to perform a zero turn operation called a zero turn using the rotation power of the third motor 301.

Figure 10:
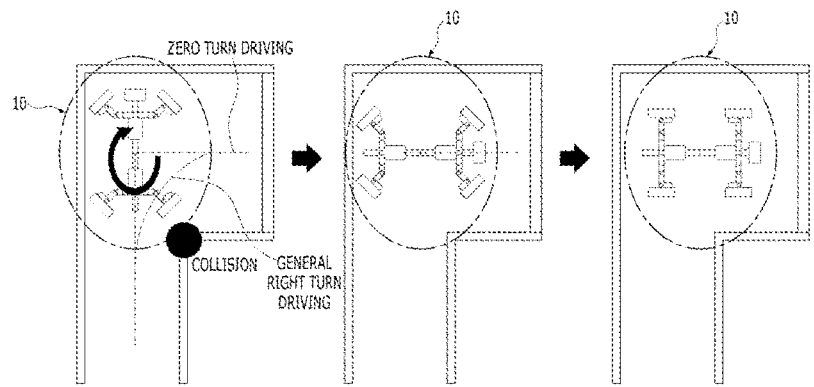
FIG. 10 depicts a situation in which an autonomous vehicle performs a 90° zero turn according to the control operation illustrated in FIGS. 9A and 9B.
Figure 11:
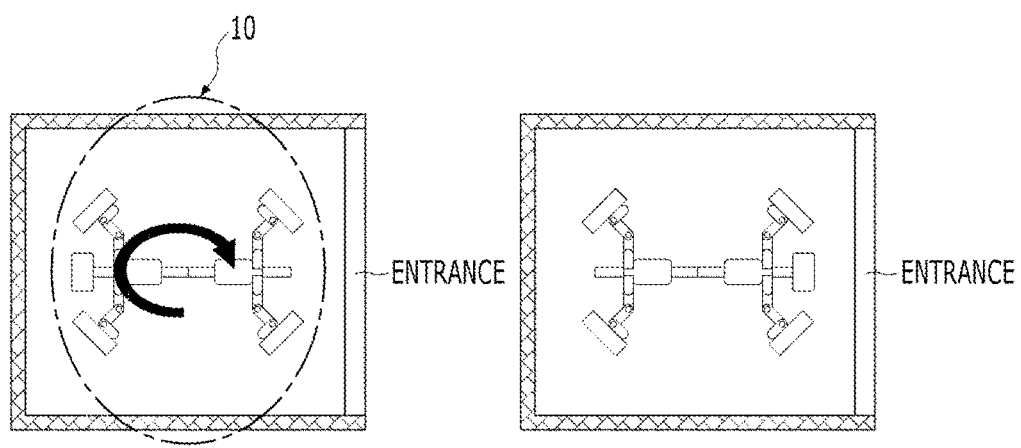
FIG. 11 depicts a situation in which an autonomous vehicle performs a 180° zero turn according to the control operation illustrated in FIGS. 9A and 9B.

FIG. 10 is a view for describing a situation in which an autonomous vehicle an autonomous vehicle performs a 90° zero turn according to the control operation illustrated in FIGS. 9A and 9B, and FIG. 11 is a view for describing a situation in which an autonomous vehicle performs a 180° zero turn according to the control operation illustrated in FIGS. 9A and 9B.

Referring to FIGS. 10 and 11, the controller 400 may transmit a 3-1 control command, which allows the third motor 301 to rotate in the first rotation direction, to the third motor 301. Then, the arrangement structure is changed to a diagonal state in which the third motor 301 rotates in the first rotation direction so that the front links 151 and 152 and the rear links 251 and 252 are symmetrical to each other through the ball screws 331 and 332 as illustrated in FIG. 9A.

Subsequently, the controller 400 transmits a moving-forward control command, which allows the in-wheel motors 110 and 120 of the front wheels and/or the in-wheel motors 210 and 220 of the rear wheels to move forward or a moving-rearward control command, which allows the in-wheel motors 110 and 120 of the front wheels and/or the in-wheel motors 210 and 220 of the rear wheels to move rearward in the state in which the arrangement structure is changed to the planar structure of FIG. 9A. While the moving-forward control command or the moving-rearward control command is maintained, the driving motor is driven so that the front/rear wheels may rotate forward or rearward.

As illustrated in FIG. 11, when the autonomous vehicle performs the 180° zero turn, the controller 400 may stop the autonomous vehicle by stopping the transmission of the moving-forward control command or the moving-rearward control command. The 180° zero turn operation may make a state in which the autonomous vehicle may perform a next driving while minimizing a driving distance without collision with the surroundings in a narrow space with only one entrance like an elevator.

In addition, as illustrated in FIG. 10, when the autonomous vehicle performs the 90° zero turn, the controller 400 may stop the autonomous vehicle by stopping the transmission of the moving-forward control command or the moving-rearward control command and transmit a 3-2 control command, which allows the third motor 301 to rotate in the second rotation direction that is a direction opposite to the first rotation direction, to the third motor 301 so that the front links 151 and 152 and the rear links 251 and 252 arranged in the diagonal state are arranged in a state of being parallel to the rack and pinions 130 and 230. The 90° zero turn operation may make a state in which the autonomous vehicle may perform a next driving while minimizing a driving distance without collision with the surroundings along a route with a narrow width in which the rotation operation of FIG. 4 or FIG. 6 is not possible like a right-angled route.

The embodiments of the present disclosure may be variously changed. In some embodiments, the steering system 10 may be changed so that the first motor 101 is installed farther from the center of the autonomous vehicle than the rack and pinion 130 is and/or the second motor 201 is installed farther from the center of the autonomous vehicle than the rack and pinion 230 is.

Then, the controller 400 may supply the control commands for the steering operations of FIGS. 2A and 2B, 3A and 3B, 5A and 5B, and 7A and 7B to the motors 101 and 201. In this case, a combination of the control commands is also changed. For example, the 1-1 control command and the 2-1 control command may be supplied for a left turn. The 1-2 control command and the 2-2 control command may be supplied for a right turn.

In addition, the steering system 10 may be changed so that the third motor 301 is positioned at the rear of the autonomous vehicle and installed to be connected to the ball screw 332. Then, the longitudinal axis module 300 includes the ball screw 332 coupled to the third motor 301 so that the ball screw 332 rotates according to the rotation power of the third motor 301, the ball screw case 342 coupled to the ball screw 332 to move along the extending axis of the ball screw 332 when the ball screw 332 rotates, the ball screw 331 coupled to the ball screw 332 so that the ball screw 331 rotates according to the rotation of the ball screw 332, and the ball screw case 341 coupled to the ball screw 331 to move along the extending axis of the ball screw 331 when the ball screw 331 rotates. The ball screw case 342 is coupled to the rack and pinion 230 so that the rack and pinion 230 moves along the extending axis according to the rotation of the ball screw 332. The ball screw case 341 is coupled to the rack and pinion 130 so that the rack and pinion 130 moves along the extending axis according to the rotation of the ball screw 331. The controller 400 may supply a changed control command for the steering operation of FIG. 9A and FIG. 9B to the motor 301.

It will be apparent to those skilled in the art that the steering system 10 may include other components. For example, the steering system 10 may include other hardware elements, which are necessary for the operations described herein, including an input device for data entry and an output device for printing or other data display.

According to another aspect of the present disclosure, an autonomous vehicle steering method of allowing an autonomous vehicle to efficiently driving in various driving environments may be provided. The steering method may be performed by the steering system 10. The steering control method may use a calculation result according to an autonomous driving program interworked to the steering system 10.

Figure 12:
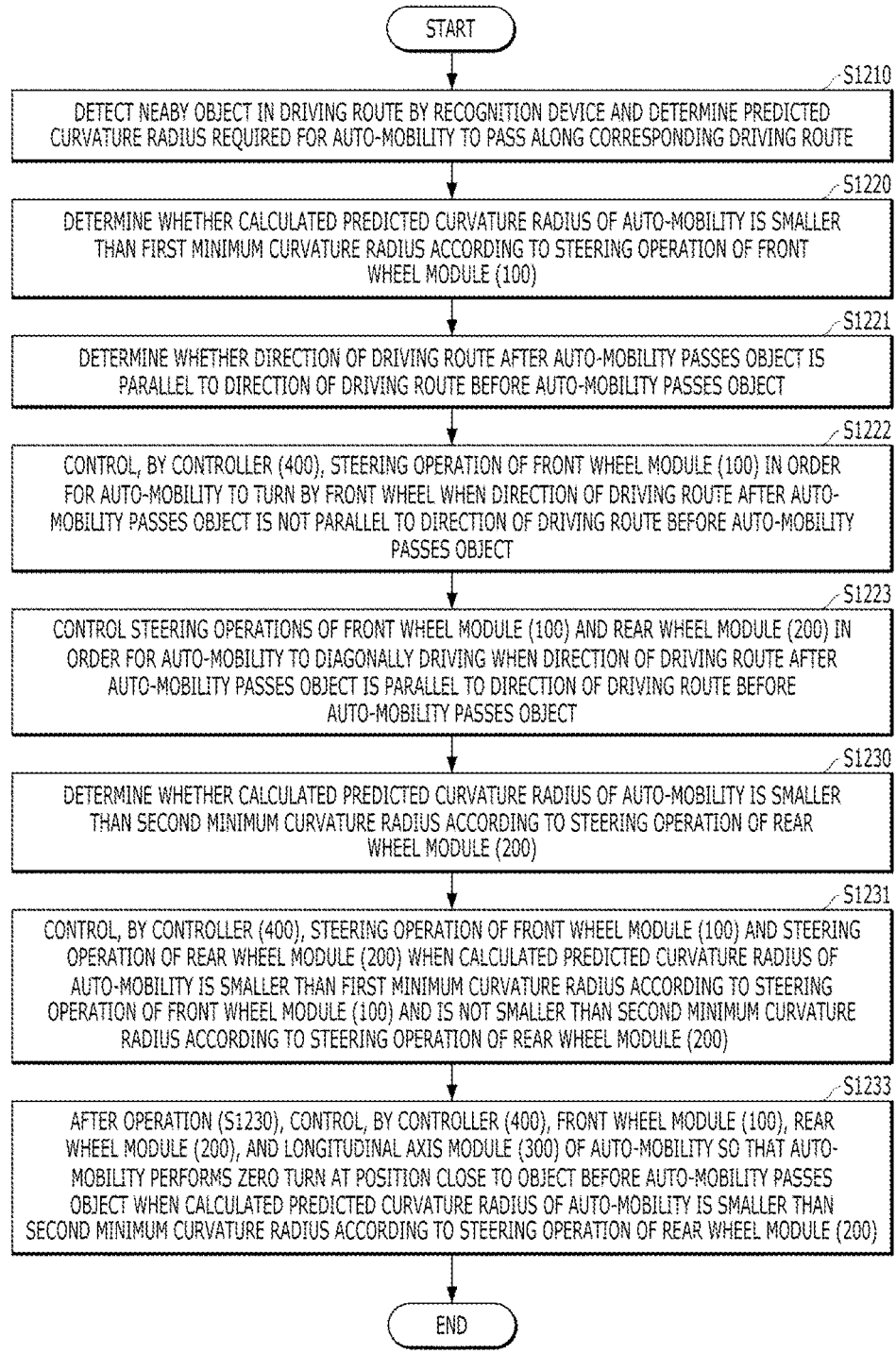
FIG. 12 is a flowchart of a steering method according to another aspect of the present disclosure.

FIG. 12 is a flowchart of a steering method according to another aspect of the present disclosure.

Referring to FIG. 12, the steering method includes detecting a nearby object in a driving route by a recognition device and calculating an predicted curvature radius required for an autonomous vehicle to pass along the corresponding driving route (S1210), determining whether the calculated predicted curvature radius of the autonomous vehicle is smaller than a first minimum curvature radius according to the steering operation of the front wheel module 100 (S1220), determining whether a direction of a driving route after the autonomous vehicle passes the object is parallel to a direction of a driving route before the autonomous vehicle passes the object when the predicted curvature radius is not smaller than the first minimum curvature radius according to the steering operation of the front wheel module 100 (S1221), controlling, by the controller 400, the steering operation of the front wheel module 100 in order for the autonomous vehicle to rotate using front wheels when the direction of the driving route after the autonomous vehicle passes the object is not parallel to the direction of the driving route before the autonomous vehicle passes the object (S1222), and controlling, by the controller 400, the steering operations of the front wheel module 100 and the rear wheel module 200 in order for the autonomous vehicle to diagonally driving when the direction of the driving route after the autonomous vehicle passes the object is parallel to the direction of the driving route before the autonomous vehicle passes the object (S1223).

The object may collide with the autonomous vehicle upon driving along the driving route like a wall or an obstacle.

In operation S1210, the controller 400 or the autonomous driving program interworked with the controller 400 may recognize a width and a position of the object while detecting the object. The controller 400 may calculate a predicted curvature radius required when the autonomous vehicle passes the corresponding driving route based on a result of self-recognition or a result of recognition received from the autonomous driving program and a pre-stored horizontal length (autonomous vehicle width) and longitudinal length of the autonomous vehicle.

When the rack and pinion 130 is maximally controlled by the steering operation of the front wheel module 100, the controller 400 calculates a steerable curvature radius based on a position of the autonomous vehicle close to the object as the first minimum curvature radius.

The controller 400 determines that the autonomous vehicle does not collide with the object even when the autonomous vehicle driving by the front wheel steering when the predicted curvature radius is not smaller than the first minimum curvature radius according to the steering operation of the front wheel module 100. That is, an autonomous driving route around the object is a route driven by the front wheel steering. The controller 400 controls the autonomous vehicle to driving around without colliding with the object by controlling the front wheel module 100 of the autonomous vehicle to enable the driving according to the front wheel steering (S1221 and S1222).

In some embodiments, the controller 400 may lock the operations of the remaining modules 200 and 300 excluding the front wheel module 100 when the predicted curvature radius is not smaller than the first minimum curvature radius according to the steering operation of the front wheel module 100 (S1222). At this time, the motor 201 and the rack and pinion 230 of the rear wheel module 200 are locked and do not perform the steering operation, and the motor 301 and the ball screws 331 and 332 of the longitudinal axis module 300 are also locked and are not driven. The controller 400 increases lifetimes of components by preventing unnecessary driving of the components when collision does not occur even when the autonomous vehicle driving by only the front wheel steering.

Meanwhile, a driving route in a case in which the direction of the driving route after the autonomous vehicle passes the object is parallel to the direction of the driving route before the autonomous vehicle passes the object may be a substantially straight driving route in which the autonomous vehicle does not straightly driving only upon avoiding the object. In such a straight driving route, it is efficient for power consumption when a speed reduction is minimized.

In order for the autonomous vehicle to stably avoid obstacles even in a high-speed driving situation, the autonomous vehicle may quickly pass the object through the diagonal driving when a turn is unnecessary and a possibility of collision with the obstacle is low. Since the control operation for diagonal driving has been described above with reference to FIGS. 7 and 8, a detailed description thereof will be omitted.

In addition, the steering method includes determining whether the calculated predicted curvature radius of the autonomous vehicle is smaller than a second minimum curvature radius according to the steering operation of the rear wheel module 200 (S1230), and controlling, by the controller 400, the steering operation of the front wheel module 100 and the steering operation of the rear wheel module 200 when the calculated predicted curvature radius of the autonomous vehicle is smaller than the first minimum curvature radius according to the steering operation of the front wheel module 100 and is not smaller than the second minimum curvature radius according to the steering operation of the rear wheel module 200 (S1231). As illustrated in FIG. 6, the second minimum curvature radius R2 is smaller than the first minimum curvature radius R1.

The controller 400 calculates the steerable curvature radius when the rack and pinion 130 is maximally controlled by the steering operation of the front wheel module 100 and when the rack and pinion 230 is controlled by the steering operation of the rear wheel module 200 as much as possible as the second minimum curvature radius.

The controller 400 determines that there is a possibility of collision with the object upon driving by only the front wheel steering when the predicted curvature radius is smaller than the first minimum curvature radius according to the steering operation of the front wheel module 100 and the predicted curvature radius is not smaller than the second minimum curvature radius according to the steering operation of the rear wheel module 200. That is, the autonomous driving route around the object is a route in which the autonomous vehicle driving by the four wheel steering. The controller 400 controls the autonomous vehicle to driving around by controlling the front wheel module 100 and the rear wheel module 200 to enable the driving according to the four wheel steering without collision with the object by turning with a turn radius greater than the first minimum curvature radius (S1231).

In some embodiments, the controller 400 may lock the operation of the remaining module 300 excluding the modules 100 and 200 for four wheel steering when the predicted curvature radius is smaller than the first minimum curvature radius according to the steering operation of the front wheel module 100 and the predicted curvature radius is not smaller than the second minimum curvature radius according to the steering operation of the rear wheel module 200. At this time, the motor 301 and the ball screws 331 and 332 of the longitudinal axis module 300 are also locked and are not driven. The controller 400 increases lifetimes of components by preventing unnecessary driving of the components when collision does not occur even when the autonomous vehicle driving by only the four wheel steering.

In addition, the steering method includes, after the operation S1230, controlling, by the controller 400, the front wheel module 100, the rear wheel module 200, and the longitudinal axis module 300 of the autonomous vehicle to perform a zero turn at a position close to the object before the autonomous vehicle passes the object when the calculated predicted curvature radius of the autonomous vehicle is smaller than the second minimum curvature radius according to the steering operation of the rear wheel module 200 (S1233).

The controller 400 determines that there is a possibility of collision with the object upon driving by only the four wheels steering when the predicted curvature radius is smaller than the second minimum curvature radius according to the steering operation of the rear wheel module 200. That is, the autonomous driving route around the object is a route in which the autonomous vehicle may not drive by the four wheel steering.

As illustrated in FIG. 10, the controller 400 may control the autonomous vehicle to continuously driving by performing a zero turn at a position close to the object before the autonomous vehicle passes the object. Since the control operation for the zero turn has been described above with reference to FIGS. 9 and 10, a detailed description thereof will be omitted.

When the steering system 10 is interworked with the autonomous driving program, the steering system 10 may determine whether driving and avoidance are possible in real time based on an autonomous vehicle dynamics model considering a minimum turning radius and a robot width in a current steering mode when a road environment is recognized by sensors such as a camera and an LiDAR installed on an autonomous vehicle such as a driving robot to generate a driving route, and actively control the autonomous vehicle by transmitting a result of determination to a motor drive to control an angle and a speed of the motor.

Since it is important for an autonomous vehicle to flexibly driving in indoor/outdoor autonomous driving environments, that is, various environments such as a sidewalk, an in-building, an elevator, and a narrow alley and reach a destination, the steering system 10 may meet a need for a mechanism that may immediately respond to the situation. In particular, the steering system 10 has an advantage to allow the autonomous vehicle to pass a narrow door more stably because the autonomous vehicle may drive after matching horizontal and longitudinal directions rather than a turning motion when the autonomous vehicle passes the narrow door such as entering an elevator.

In addition, according to the steering control method performed by the steering system 10, by selectively allowing the steering operation suitable for the driving environment, it is possible to minimize driving of components unnecessary for achieving a driving result without collision, thereby increasing a lifetime of the steering system 10.

In the above-described embodiments, a steering system for an autonomous vehicle having front wheels and rear wheels according to one aspect of the present disclosure includes a front wheel module 100 configured to steer the front wheels of the autonomous vehicle through rotation power of a first motor 101, a rear wheel module 200 configured to steer the rear wheels of the autonomous vehicle through rotation power of a second motor 201, a longitudinal axis module 300 connecting the front wheel module 100 to the rear wheel module 200 and configured to steer each of left/right wheels of the front wheels and left/right wheels of the rear wheels of the autonomous vehicle inward through rotation power of a third motor 301. The steering system further includes a controller 400 configured to control a driving motor configured to provide the rotation power to the first to third motors and at least one of the front wheels and the rear wheels.

In one embodiment, the front wheel module 100 may include a rack and pinion 130 installed between a left wheel 11 and a right wheel 12 of the front wheels and having a rack 131 moving to a left side or a right side by the rotation power of the first motor 101 in order to steer the front wheels, front links 151, 152 of which one ends are connected to both ends of the rack and pinion 130 through joints 141, 142, and base frames 171, 172 connected to the other ends of the front links 151, 152 through joints 161, 162 and configured to support the left wheel 11 and the right wheel 12 of the front wheels. The rear wheel module 200 may include a rack and pinion 230 installed between a left wheel 21 and a right wheel 22 of the rear wheels and having a rack 231 moving to a left side or a right side by the rotation power of the second motor 201 to steer the rear wheels, rear links 251, 252 of which one ends are connected to both ends of the rack and pinion 230 through joints 241, 242, and base frames 271, 272 connected to the other ends of the rear links 251, 252 through joints 261, 262 and configured to support the left wheel 21 and the right wheel 22 of the rear wheels.

Wherein the joints 161, 162 may be coupled to the front links 151, 152 and the base frames 171, 172 to turn about a coupling axis when a steering control force generated by the movement of the rack 131 in a left or right direction is applied thereto. Wherein the joints 261, 262 may be coupled to the rear links 251, 252 and the base frames 271, 272 to turn about a coupling axis when the steering control force generated by the movement of the rack 231 in the left or right direction is applied thereto.

In one embodiment, the controller 400 may be configured to supply a 1-1 control command, which allows the rack 131 to move in the left direction by rotating the first motor 101 in a first rotation direction, to the first motor 101 in order to control the autonomous vehicle to turn left, and supply a 1-2 control command, which allows the rack 131 to move in the right direction by rotating the first motor 101 in a second rotation direction that is a direction opposite to the first rotation direction, to the first motor 101 in order to control the autonomous vehicle to turn right.

In one embodiment, the controller 400 may be further configured to supply a 2-2 control command, which allows the rack 231 to move in the left direction by rotating the second motor 201 in the second rotation direction, to the second motor 201 in order to further reduce a left-turn radius of the autonomous vehicle than that of a case of steering only the front wheels or steering only the rear wheels, and supply a 2-1 control command, which allows the rack 231 to move in the right direction by rotating the second motor 201 in the first rotation direction, to the second motor 201 in order to further reduce a right-turn radius of the autonomous vehicle than that of a case of steering only the front wheels or steering only the rear wheels.

In one embodiment, the controller 400 may be configured to supply a 1-1 control command, which allows the rack 131 to move in the left direction by rotating the first motor 101 in a first rotation direction, to the first motor 101 and supply a 2-2 control command, which allows the rack 231 to move in the right direction by rotating the second motor 201 in a second rotation direction that is a direction opposite to the first rotation direction, to the second motor 201 in order for the autonomous vehicle to driving in a left diagonal direction. The controller 400 may be configured to supply a 1-2 control command, which allows the rack 131 to move in the right direction by rotating the first motor 101 in the second rotation direction, to the first motor and supply a 2-1 control command, which allows the rack 231 to move in the left direction by rotating the second motor 201 in the first rotation direction, to the second motor 201 in order for the autonomous vehicle to driving in a right diagonal direction. A steering angle according to the 1-1 control command and a steering angle according to the 2-2 control command may be parallel to each other. A steering angle according to the 1-2 control command and a steering angle according to the 2-1 control command may be parallel to each other.

In one embodiment, the joints 141, 142 may be coupled to the rack and pinion 130 and the front links 151, 152 so that the steering control force according to the movement of the rack 131 is transmitted to the base frames 171, 172 through the front links 151, 152 without turning about the coupling axis when the rack 131 moves in the left or right direction, and the joints 241, 242 may be coupled to the rack and pinion 230 and the rear links 251, 252 so that the steering control force according to the movement of the rack 231 is transmitted to the base frames 271, 272 through the rear links 251, 252 without turning about the coupling axis when the rack 231 moves in the left or right direction.

In one embodiment, the longitudinal axis module 300 may include a ball screw 331 coupled to the third motor 301 so that the ball screw 331 rotates according to the rotation power of the third motor 301, a ball screw case 341 coupled to the ball screw 331 to move along an extending axis of the ball screw 331 when the ball screw 331 rotates, wherein the ball screw case 341 is coupled to the rack and pinion 130 so that the rack and pinion 130 moves along the extending axis according to the rotation of the ball screw 331, a ball screw 332 coupled to the ball screw 331 so that the ball screw 332 rotates according to the rotation of the ball screw 331, and a ball screw case 342 coupled to the ball screw 332 to move along an extending axis of the ball screw 332 when the ball screw 332 rotates, wherein the ball screw case 342 is coupled to the rack and pinion 230 so that the rack and pinion 230 moves along the extending axis according to the rotation of the ball screw 332.

In one embodiment, the rack and pinions 130, 230 may be coupled to the extending axes of the ball screws 331, 332 in an orthogonal state. When the third motor 301 rotates in a first rotation direction, the base frames 171, 172 do not turn about the joints 161, 162, angles between the base frames 171, 172 and the front links 151, 152 may be fixed in the front wheel module 100, wherein one ends of the front links 151, 152 connected to the rack and pinion 130 may move by turning about the joints 141, 142, and thus the front links 151, 152 may be diagonally arranged in a plan view of the autonomous vehicle. The base frames 271, 272 do not turn about the joints 261, 262, angles between the base frames 271, 272 and the rear links 251, 252 may be fixed in the rear wheel module 200, wherein one ends of the rear links 251, 252 connected to the rack and pinion 230 may move by turning about the joints 241, 242. Thus, the rear links 251, 252 may be diagonally arranged to be symmetrical to the front links 151, 152 in the plan view of the autonomous vehicle. and In one embodiment, in order to control the autonomous vehicle to perform a zero turn, the controller 400 may be configured to transmit a 3-1 control command, which allows the third motor 301 to rotate in the first rotation direction, to the third motor 301, and transmit a moving-forward control command or a moving-rearward control command to the driving motor in a state in which arrangement structures of the front links 151, 152 and the rear links 251, 252 are diagonally arranged.

In one embodiment, the controller 400 may be further configured to stop the autonomous vehicle by stopping the transmission of the moving-forward control command or the moving-rearward control command when the autonomous vehicle performs a 90° zero turn, and transmit a 3-2 control command, which allows the third motor 301 to rotate in a second rotation direction that is a direction opposite to the first rotation direction, to the third motor 301 in order to arrange the front links 151, 152 and the rear links 251, 252 arranged in the diagonal state in a state of being parallel to the rack and pinions 130, 230.

An autonomous driving autonomous vehicle according to another aspect of the present disclosure may be equipped with the steering system according to the above-described embodiments and may include in-wheel motors installed on left/right wheels of at least one of the front wheels and the rear wheels. The base frames 171, 172, 271, 272 may be coupled to the in-wheel motors 110, 120, 210, 220.

In the case of implementing the embodiments of the present disclosure using hardware, an application specific integrated circuit (ASIC), a digital signal processor (DSP), a digital signal processing device (DSPD), a programmable logic device (PLD), a field programmable gate array (FPGA), or the like configured to perform the present disclosure may be provided as a processor of the present disclosure.

Meanwhile, the above-described invention may be written as a program executable on a computer, and implemented in a general-purpose digital computer for operating the program using a computer-readable medium. In addition, a structure of data used in the above-described method may be recorded on a computer-readable storage medium through various devices. It should not be understood that program storage devices that may be used to describe a storage device including an executable computer code for performing various methods of the present disclosure include transitory objects such as carrier waves or signals. The computer-readable storage medium includes storage media such as a magnetic storage medium (e.g., a read only memory (ROM), a floppy disk, or a hard disk) and an optical reading medium (e.g., a compact disc read only memory (CD-ROM) or a digital video disc (DVD)).

The above-described embodiments are those in which components and features of the present disclosure are coupled in a predetermined form. Each component or feature should be considered optional unless explicitly stated otherwise. Each component or feature may be carried out in a form not coupled with another component or feature. In addition, the embodiments of the present disclosure may also be formed by coupling some components and/or features. The order of operations described in the embodiments of the invention may be changed. Some components or features of any embodiment may be included in another embodiment or may be replaced with corresponding components or features of another embodiment. It is obvious that claims that do not have an explicit citation relationship in the appended claims may be combined to form an embodiment or may be included as a new claim by amendment after filing.

It will be apparent to those skilled in the art to which the present disclosure pertains that the present disclosure may be specified in other forms without departing from the technical spirit and essential features of the present disclosure. Therefore, the embodiments should be considered in all respects as illustrative rather than restrictive. The scope of the present disclosure should be determined by reasonable construction of the appended claims and all possible changes within the equivalent scope of the present disclosure.

What is claimed is:

1. A steering system installed in an autonomous vehicle having front wheels and rear wheels, comprising:
    a front wheel module including a first motor and configured to steer the front wheels of the autonomous vehicle left or right through a first rotation power of the first motor;
    a rear wheel module including a second motor and configured to steer the rear wheels of the autonomous vehicle left or right through a second rotation power of the second motor;
    a longitudinal axis module coupled to both the front wheel module and the rear wheel module to connect the front wheel module to the rear wheel module and including a third motor and configured to steer each of a left wheel and a right wheel of the front wheels and each of a left wheel and a right wheel of the rear wheels of the autonomous vehicle inward through a third rotation power of the third motor; and
    a controller configured to control the first motor of the front wheel module, the second motor of the rear wheel module and the third motor of the longitudinal axis module, wherein the controller controls the third motor of the longitudinal axis module to steer the rear wheels and the front wheels inward;
    wherein the longitudinal axis module includes:
    a first ball screw coupled to the third motor so that the first ball screw rotates according to the third rotation power of the third motor;
    a first ball screw case coupled to the first ball screw to move along an extending axis of the first ball screw when the first ball screw rotates, wherein the first ball screw case is coupled to a first rack and pinion so that the first rack and pinion moves along the extending axis according to the rotation of the first ball screw, wherein the front wheels steer inward if the first rack and pinion moves to a rear direction;
    a second ball screw coupled to the first ball screw so that the second ball screw rotates according to the rotation of the first ball screw; and
    a second ball screw case coupled to the second ball screw to move along an extending axis of the second ball screw when the second ball screw rotates, wherein the second ball screw case is coupled to the second rack and pinion so that the second rack and pinion moves along the extending axis according to the rotation of the second ball screw, wherein the rear wheels steer inward if the second rack and pinion moves to a front direction;

wherein the first and second rack and pinions are coupled to the extending axes of the first ball screw and the second ball screw in an orthogonal state.

2. The steering system of claim 1, wherein the front wheel module includes:
a first rack and pinion installed between the left wheel and the right wheel of the front wheels and having a first rack moving to a left side or a right side by the first rotation power of the first motor in order to steer the front wheels;
front links having one ends connected to both ends of the first rack and the pinion through first joints within the front wheel module; and
front base frames connected to the other ends of the front links through the first joints within the front wheel module and configured to support the left wheel and the right wheel of the front wheels; and wherein the rear wheel module includes:
a second rack and pinion installed between the left wheel and the right wheel of the rear wheels and having a second rack moving to a left side or a right side by the second rotation power of the second motor in order to steer the rear wheels;
rear links having one ends connected to both ends of the second rack and pinion through second joints; and
rear base frames connected to the other ends of the rear links through second joints within the rear wheel module and configured to support the left wheel and the right wheel of the rear wheels,
wherein the first joints within the front wheel module are coupled to the front links and the front base frames of the front wheel module to turn about a first coupling axis when a steering control force generated by a first movement of the first rack in a left or right direction is applied thereto, and
wherein the second joints within the rear wheel module are coupled to the rear links and the rear base frames within the rear wheel module to turn about a second coupling axis when the steering control force generated by a second movement of the second rack in the left or right direction is applied thereto.

3. The steering system of claim 2, wherein the controller is configured to:
supply a 1-1 control command, which allows the first rack to move in a left direction toward the left wheel of the front wheels by rotating the first motor in a first rotation direction, to the first motor in order to control the autonomous vehicle to turn left; and
supply a 1-2 control command, which allows the first rack to move in a right direction toward the right wheel of the front wheels by rotating the first motor in a second rotation direction that is a direction opposite to the first rotation direction, to the first motor in order to control the autonomous vehicle to turn right.

4. The steering system of claim 3, wherein the controller is further configured to:
supply a 2-2 control command, which allows the second rack to move in the left direction by rotating the second motor in the second rotation direction, to the second motor in order to further reduce a left-turn radius of the autonomous vehicle than the left-turn radius of steering the front wheels or steering the rear wheels; and wherein the controller is further configured to:
supply a 2-1 control command, which allows the second rack to move in the right direction by rotating the second motor in the first rotation direction, to the second motor in order to further reduce a right-turn radius of the autonomous vehicle than the right-turn radius of steering the front wheels or steering the rear wheels.

5. The steering system of claim 2, wherein the controller is configured to:
supply a 1-1 control command, which allows the first rack to move in a left direction toward the left wheel of the front wheels by rotating the first motor in a first rotation direction, to the first motor, and
supply a 2-2 control command, which allows the second rack to move in a right direction toward the right wheel of the front wheels by rotating the second motor in a second rotation direction that is a direction opposite to the first rotation direction, to the second motor in order for the autonomous vehicle to drive in a left diagonal direction; and wherein the controller is further configured to:
supply a 1-2 control command, which allows the first rack to move in the right direction by rotating the first motor in the second rotation direction, to the first motor, and
supply a 2-1 control command, which allows the second rack to move in the left direction by rotating the second motor in the first rotation direction, to the second motor in order for the autonomous vehicle to drive in a right diagonal direction,
wherein a steering angle according to the 1-1 control command and a steering angle according to the 2-2 control command are parallel to each other, and
wherein a steering angle according to the 1-2 control command and a steering angle according to the 2-1 control command are parallel to each other.

6. The steering system of claim 2, wherein the first joints within the front wheel module are coupled to the first rack and pinion and the front links so that the steering control force according to the first movement of the first rack is transmitted to the front base frames within the front wheel module through the front links without turning about the first coupling axis when the first rack moves in the left or right direction, and
wherein the second joints within the rear wheel module are coupled to the second rack and pinion and the rear links so that the steering control force according to the second movement of the second rack is transmitted to the rear base frames through the rear links without turning about the second coupling axis when the second rack moves in the left or right direction.

7. The steering system of claim 1,
wherein when the third motor rotates in a first rotation direction,
in the front wheel module, the front base frames within the front wheel module do not turn about first joints within the front wheel module, angles between the front base frames within the front wheel module and front links are fixed, wherein one ends of the front links connected to the first rack and pinion move by turning about the first joints within the front wheel module, and thus the front links are diagonally arranged in a plan view of the autonomous vehicle,
in the rear wheel module, rear base frames within the rear wheel module do not turn about second joints within the rear wheel module, angles between the rear base frames within the rear wheel module and rear links are fixed, wherein one ends of the rear links connected to the second rack and pinion move by turning about the first joints within the rear wheel module, and thereby the rear links are diagonally arranged to be symmetrical to the front links in the plan view of the autonomous vehicle.

8. The steering system of claim 7, wherein, in order to control the autonomous vehicle to perform a zero turn, the controller is configured to:

transmit a 3-1 control command, which allows the third motor to rotate in the first rotation direction, to the third motor; and transmit a moving-forward control command or a moving-rearward control command to a driving motor in a state in which arrangement structures of the front links and the rear links are diagonally arranged.

9. The steering system of claim 8, wherein the controller is further configured to:

stop the autonomous vehicle by stopping a transmission of the moving-forward control command or the moving-rearward control command when the autonomous vehicle performs a 90° zero turn, and transmit a 3-2 control command, which allows the third motor to rotate in a second rotation direction that is a direction opposite to the first rotation direction, to the third motor in order to arrange the front links and the rear links arranged in a diagonal state in a state of being parallel to the first and second rack and pinions.

10. An autonomous driving vehicle in which the steering system according to claim 1 is installed, comprising at least a pair of in-wheel motors installed on left wheels and right wheels of at least one of the front wheels and the rear wheels, wherein base frames are coupled to the in-wheel motors, wherein the controller is configured to further control four in-wheel motors.

11. A steering method performed by the steering system according to claim 1, comprising:

detecting an object nearby in a driving route by a recognition device and calculating a predicted curvature radius required for an autonomous vehicle to pass along a corresponding driving route;

determining whether the calculated predicted curvature radius of the autonomous vehicle is smaller than a first minimum curvature radius according to a steering operation of the front wheel module;

determining whether a direction of a driving route after the autonomous vehicle passes the object is parallel to a direction of a driving route before the autonomous vehicle passes the object when the predicted curvature radius is not smaller than the first minimum curvature radius according to the steering operation of the front wheel module;

controlling, by the controller, the steering operation of the front wheel module in order for the autonomous vehicle to turn by the front wheels when the direction of the driving route after the autonomous vehicle passes the object is not parallel to the direction of the driving route before the autonomous vehicle passes the object; and controlling, by the controller, steering operations of the front wheel module and a rear wheel module in order for the autonomous vehicle to diagonally driving when the direction of the driving route after the autonomous vehicle passes the object is parallel to the direction of the driving route before the autonomous vehicle passes the object.

12. The method of claim 11, further comprising:

determining whether the calculated predicted curvature radius of the autonomous vehicle is smaller than a second minimum curvature radius according to a steering operation of the rear wheel module;

controlling, by the controller, the steering operation of the front wheel module and the steering operation of the rear wheel module when the calculated predicted curvature radius of the autonomous vehicle is smaller than the first minimum curvature radius according to the steering operation of the front wheel module and is not smaller than the second minimum curvature radius according to the steering operation of the rear wheel module; and after operation, controlling, by the controller, the front wheel module, the rear wheel module, and a longitudinal axis module of the autonomous vehicle to perform a zero turn at a position close to the object before the autonomous vehicle passes the object when the calculated predicted curvature radius of the autonomous vehicle is smaller than the second minimum curvature radius according to the steering operation of the rear wheel module, and the second minimum curvature radius is smaller than the first minimum curvature radius.

* * * * *